US012135675B2

(12) United States Patent
Eaton et al.

(10) Patent No.: US 12,135,675 B2
(45) Date of Patent: *Nov. 5, 2024

(54) DEVICE WITH BIOMETRIC PROCESS SYNCHRONIZATION

(71) Applicant: IDEX Biometrics ASA, Oslo (NO)

(72) Inventors: Anthony Michael Eaton, Hampshire (GB); Peter Eckehard Kollig, Hampshire (GB); Keith Ahluwalia, Wiltshire (GB); Tuck Weng Poon, Hampshire (GB)

(73) Assignee: IDEX Biometrics ASA, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,217

(22) Filed: Apr. 24, 2023

(65) Prior Publication Data

US 2023/0259483 A1    Aug. 17, 2023

Related U.S. Application Data

(63) Continuation of application No. 16/980,160, filed as application No. PCT/EP2019/056170 on Mar. 12, 2019, now Pat. No. 11,687,482.

(30) Foreign Application Priority Data

Mar. 12, 2018  (GB) .................................... 1803935

(51) Int. Cl.
*G06F 13/40* (2006.01)
*G06F 9/345* (2018.01)
(Continued)

(52) U.S. Cl.
CPC .......... *G06F 13/4282* (2013.01); *G06F 9/345* (2013.01); *G06F 9/4411* (2013.01); *G06F 2213/0016* (2013.01)

(58) Field of Classification Search
CPC .................................................. G06F 13/4082
(Continued)

(56) References Cited

U.S. PATENT DOCUMENTS 5,758,190 A * 5/1998 Johnson .............. G06F 11/0757
710/48
7,975,057 B2 * 7/2011 Guterman ............. G07F 7/1008
709/229
(Continued)

FOREIGN PATENT DOCUMENTS

CN    2007101065938    10/2007
CN    2008101114348    1/2008
(Continued)

OTHER PUBLICATIONS

PCT Application No. PCT/EP2019/056170 International Search Report and Written Opinion, Jul. 11, 2019, 12 pages.
(Continued)

*Primary Examiner* — Titus Wong
(74) *Attorney, Agent, or Firm* — Smith Tempel Blaha LLC; Michael J. Tempel

(57) ABSTRACT

A device for contactless communication with a terminal, comprising: an antenna for communication with the terminal, an embedded chip configured to communicate with the terminal in accordance with a contactless transmission protocol whereby a message sent by the terminal sets a specified initial waiting time for a response from the embedded chip to maintain a connection with the terminal, the embedded chip being configured to communicate requests to the terminal to extend the waiting time for response, and a module configured to perform processing formed of a plurality of discrete operations, the module being configured to, in response to completing a subset of one or more discrete operations within a waiting time interval set by the terminal, send a first type of command to the embedded chip if the (Continued)

processing is not complete: wherein the embedded chip is further configured to, in response to receiving the first type of command, communicate a request to the terminal to extend the waiting time for response.

16 Claims, 13 Drawing Sheets

(51) Int. Cl.
  *G06F 9/4401* (2018.01)
  *G06F 13/42* (2006.01)
(58) Field of Classification Search
  USPC .......................................................... 710/313
  See application file for complete search history.

(56) References Cited

U.S. PATENT DOCUMENTS

| | | | | |
|---|---|---|---|---|
| 8,811,896 | B2* | 8/2014 | Katz | G06K 7/10237 |
| | | | | 455/41.1 |
| 9,552,584 | B1* | 1/2017 | Bierbaum | G06Q 20/363 |
| 2002/0080965 | A1 | 6/2002 | Marinet et al. | |
| 2009/0004969 | A1* | 1/2009 | Luong | H04W 84/18 |
| | | | | 455/41.1 |
| 2010/0009627 | A1* | 1/2010 | Huomo | H04B 5/02 |
| | | | | 455/41.1 |
| 2010/0259216 | A1 | 10/2010 | Capomaggio | |
| 2012/0178366 | A1* | 7/2012 | Levy | G06K 7/10237 |
| | | | | 455/41.1 |
| 2014/0113548 | A1* | 4/2014 | Camulli | H04M 3/5231 |
| | | | | 455/41.1 |
| 2014/0113549 | A1* | 4/2014 | Beg | H04W 4/12 |
| | | | | 455/41.1 |
| 2015/0180866 | A1* | 6/2015 | Hama | G06F 21/32 |
| | | | | 726/6 |
| 2016/0192149 | A1* | 6/2016 | Zises | H04W 4/027 |
| | | | | 455/456.3 |
| 2016/0261973 | A1* | 9/2016 | Socol | H04W 4/80 |
| 2016/0364730 | A1* | 12/2016 | Rans | G06Q 20/3574 |
| 2018/0205728 | A1* | 7/2018 | Bradley | H04W 12/069 |

FOREIGN PATENT DOCUMENTS

| | | |
|---|---|---|
| CN | 2014105518720 | 9/2014 |
| CN | 2016105809234 | 7/2016 |
| CN | 105938566 | 9/2016 |
| CN | 2015105939165 | 9/2016 |
| CN | 2016105938566 | 9/2016 |
| EP | 2071497 | 6/2009 |
| EP | 20142809089 | 3/2014 |
| EP | 2809089 | 12/2014 |
| EP | 3057039 | 8/2016 |
| EP | 3404585 | 11/2018 |
| GB | 2531378 | 4/2016 |

OTHER PUBLICATIONS

Extended European Search Report Related App. No. 22158974.0-1205 dated Jun. 22, 2022.

* cited by examiner

DEVICE WITH BIOMETRIC PROCESS SYNCHRONIZATION

This patent application claims priority under 35 U.S.C. § 120 to and is a continuation of U.S. patent application Ser. No. 16/980,160, filed Sep. 11, 2020, entitled "DEVICE PROCESS SCHEDULING," which is a U.S. National Phase application of PCT/EP2019/056170, filed Mar. 12, 2019, which claims priority to foreign application GB 1803935.4, filed Mar. 12, 2018. The entire contents of the above-listed applications are hereby incorporated by reference.

FIELD

This invention relates to process scheduling within a device when in communication with a terminal.

BACKGROUND

A smart card may refer to a device that includes an embedded integrated circuit chip and internal memory. That internal memory may be located on the integrated circuit chip, or be a separate chip embedded within the card. A smart card may be a contact card; a contactless card, or may be capable of operating as a contact and a contactless card. Smart cards exist in a wide variety of form factors, including plastic cards, key fobs, watches, wearables, electronic passports and USB-based tokens and subscriber identification modules (SIMs) used in mobile phones A contact card communicates with a terminal (e.g. a card reader) by physically connecting to the terminal. For example, a contact card may comprise one or more contact pads that provide electrical connectivity to the terminal when the card and terminal are brought into suitable physical contact (e.g. by inserting the card into a slot within the terminal).

A contactless card communicates with a terminal without direct physical contact. Typically, a contactless card communicates with a terminal via radio waves. The contactless card may include an antenna to receive an electromagnetic signal, such as an RF signal, emitted from a terminal. Likewise, data from the card can be communicated back to the terminal by means of the card's antenna.

Some contactless cards are 'passive'. A passive card powers the embedded chip from energy harvested from the signal emitted by the terminal. One way to harvest energy from the emitted signal is to arrange the antenna as a coil that induces a voltage across its terminals by means of induction when receiving the emitted signal.

Smart card technology is being implemented within a variety of devices used to perform increasingly varied functions, for example to perform payments, grant a user physical access to a region of an environment, to store personal identification information of the user, identify or authenticate a user, etc. In some cases, it may be desirable for a device to be capable of performing multiple different functions.

There are several difficulties faced when trying to implement multiple functionalities into a device using smart card technology, particularly when a device designed to perform a 'base' or primary function is adapted to perform additional functions. One problem is that industry standards governing smart card technology were originally designed for payment/authentication cards. Existing infrastructure has therefore been designed in compliance with these standards that is suitable for powering this primary function of facilitating payments or transactions, which may place constraints on the power that can be consumed by any additional functionality placed onto the card. This problem may be compounded by the fact the additional functions may consume more power and/or require power for a longer period of time than the primary function of the card. A further problem is that for cards operating in a contactless mode, the power drawn by the additional functionality may affect the load modulation of the signal emitted by the terminal, which may appear as extra noise to the terminal.

It would therefore be desirable for a device implementing smart card technology that supports multiple functions to provide flexibility to save power consumption where possible and to share the available power with the primary function of the device.

SUMMARY

According to the present invention there is provided a device for contactless communication with a terminal, comprising:
   an antenna for communication with the terminal;
   an embedded chip configured to communicate with the terminal in accordance with a contactless transmission protocol whereby a message sent by the terminal sets a specified initial waiting time for a response from the embedded chip to maintain a connection with the terminal, the embedded chip being configured to communicate requests to the terminal to extend the waiting time for response; and
   a module configured to perform processing formed of a plurality of discrete operations, the module being configured to, in response to completing a subset of one or more discrete operations within a waiting time interval set by the terminal, send a first type of command to the embedded chip if the processing is not complete;
wherein the embedded chip is further configured to, in response to receiving the first type of command, communicate a request to the terminal to extend the waiting time for response.

The waiting time interval may be a time period in which a communication is to be sent from the embedded chip to the terminal to maintain the connection therebetween. The waiting time interval may be the time period in which a response to the message or a waiting time extension request is to be communicated from the embedded chip to the terminal to maintain the connection. The waiting time interval may be between the time the message from the terminal was received and the initial specified waiting time, or the interval between the time a waiting time extension request was sent to the terminal and an extended waiting time resulting from that request.

The embedded chip may be configured to, in response to receiving the command before expiry of the waiting time interval, initiate the communication of the request to the terminal prior to the expiry of the waiting time interval.

The module may be configured to not be constrained to respond to a message sent from the terminal.

The module may be further configured to enter a low-power mode once it has sent the command to the embedded chip.

The embedded chip may be further configured to enter a low-power mode when it is not communicating with either the terminal or the module, and not participating in the processing performed by the module.

The embedded chip may be configured to indicate to the module that the waiting time extension request has been sent to the terminal. The module may be configured to exit the low power mode in response to that indication.

The module may comprise a controller unit configured to select a subset of one or more discrete operations to be completed in dependence on the waiting time interval. The controller unit may be configured to, in response to the indication the waiting time extension request has been sent to the terminal, select the subset of one or more discrete operations to be performed within the waiting time interval resulting from that request.

The module may be further configured to, in response to completing the subset of one or more discrete operations within the waiting time interval, determine whether the processing is complete.

The module may be further configured to send a second type of command to the embedded chip if it determines the processing is complete.

The embedded chip may be configured to, in response to receiving the second type of command, determine whether an action requested by the terminal is complete and:
  communicate to the terminal an indication that the action is complete in response to determining that the action is complete; and
  communicate to the terminal a waiting time extension request in response to determining that the action is not complete.

The action requested by the terminal may be an identity authentication or identity enrolment. The module may be a biometric sensor module. The module may be configured to perform processing as part of performing a biometric authentication process. The module may be configured to perform processing as part of performing a biometric enrolment process.

The biometric sensor module may comprises a biometric sensor, and an ASIC for controlling operation of the biometric sensor.

The subset of one or more discrete operations may be a boot-up of the ASIC. The subset of one or more discrete operations may be acquiring at least a part of a biometric parameter using the biometric sensor. The subset of one or more discrete operations may be performing parameter matching on at least a portion of a biometric parameter captured by the biometric sensor.

The device may be a proximity integrated circuit card (PICC) and the terminal a proximity coupling device (PCD). The transmission protocol may be specified by the ISO14443, ISO1443 or EMVCo® standards.

There may be provided a method of contactless communication between a device and a terminal, the device comprising an embedded chip configured to communicate with the terminal in accordance with a contactless transmission protocol whereby a message sent by the terminal sets a specified initial waiting time for a response from the embedded chip to maintain a connection with the terminal, the embedded chip being configured to communicate requests to the terminal to extend the waiting time for response, the method comprising:
  performing at the module within the device processing formed of a plurality of discrete operations during a waiting time interval set by the terminal;
  in response to completing a subset of one or more discrete operations within the waiting time interval set by the terminal, sending a first type of command from the module to the embedded chip if the processing is not complete;
  in response to receiving the first type of command, communicating from the embedded chip to the terminal a request to extend the waiting time for response.

According to another aspect of the present disclosure there is provided a device for contactless communication with a terminal, comprising:
  an antenna for communication with the terminal;
  an embedded chip configured to communicate with the terminal in accordance with a contactless transmission protocol whereby a message sent by the terminal sets a specified initial waiting time for a response from the embedded chip to maintain a connection with the terminal, the embedded chip being configured to communicate requests to the terminal to extend the waiting time for response; and
  a module configured to perform processing formed of a plurality of discrete operations;
  wherein the embedded chip is configured to, for each waiting time extension request sent to the terminal: communicate a first signal to the module indicating the waiting time extension request has been sent to the terminal; and communicate a second signal to the module in advance of the extended waiting time resulting from that extension request indicating a further waiting time extension request is scheduled for communication to the terminal; and
  wherein the module is configured to: begin processing a subset of one or more discrete operations in response to the first signal; and stop processing the subset of discrete operations in response to the second signal.

The module ma be further configured to transition to a low-powered state in response to the second signal.

The first signal may cause the module to transition out of the low-powered state to an active state in which it can process discrete operations.

The module may be configured to, in response to the second signal, determine whether the processing is complete and if so, send an indication that the processing is complete to the embedded chip.

The embedded chip may be configured to, in response to receiving the indication that the processing is complete, determine whether an action requested by the terminal is complete and:
  communicate to the terminal an indication that the action is complete in response to determining that the action is complete; and
  communicate to the terminal a waiting time extension request in response to determining that the action is not complete.

The action requested by the terminal may be an identity authentication or identity enrolment The embedded chip may be configured to communicate the second signal a specified time period prior to communicating the further waiting time extension request to the terminal.

The module may be configured to transition to the low-powered state within the specified time period from receiving the second signal.

The embedded chip may be further configured to enter a low-power mode when it is not communicating with either the terminal or the module, and not participating in the processing performed by the module.

The device may comprise a communication link between the chip and module, the chip being configured to communicate the first signal by driving the state of the communication link from a first state to a second state.

The chip may be configured to communicate the second signal by driving the state of the communication link from the second state back to the first state.

The communication link may be an I²C bus or a Serial Peripheral Interface (SPI) bus The module may be further configured to communicate to the embedded chip a third signal indicating receipt of the first signal.

The device may comprise a first and second communication link between the chip and the module, the chip being configured to communicate the first and second signals over the first communication link, and the module being configured to communicate the third signal over the second communication link.

The module may be further configured to communicate to the embedded chip a fourth signal indicating receipt of the second signal.

The module may be configured to communicate the fourth signal over the second communication link.

The module may be configured to: communicate the third signal by driving the state of the second communication link from a first state to a second state; and communicate the fourth signal by driving the state of the communication link from the second state back to the first state.

The embedded chip may be further configured to recommunicate the first signal to the module if it does not receive from the module the third signal within a specified waiting time.

The embedded chip may be configured to wait for a specified time period after expiry of the specified waiting time before recommunicating the first signal.

The module may be a biometric sensor module.

The module may be configured to perform processing as part of performing a biometric authentication process. The module may be configured to perform processing as part of performing a biometric enrolment process The biometric sensor module may comprise a controller unit, a biometric sensor, and an ASIC for controlling operation of the biometric sensor.

The embedded chip is configured to send the first and second signals to the ASIC following boot-up of the ASIC.

The controller unit may be configured to boot-up the ASIC in response to receiving a boot-up signal from the embedded chip following communication of a waiting time extension request to the terminal.

The device may be a proximity integrated circuit card (PICC) and the terminal a proximity coupling device (PCD). The transmission protocol may be specified by the ISO14443, ISO1443 or EMVCo® standards.

There may be provided a method of contactless communication between a device and a terminal, the device comprising a module configured to perform processing formed of a plurality of discrete operations, and an embedded chip configured to communicate with the terminal in accordance with a contactless transmission protocol whereby a message sent by the terminal sets a specified initial waiting time for a response from the embedded chip to maintain a connection with the terminal, the embedded chip being configured to communicate requests to the terminal to extend the waiting time for response, the method comprising, for each waiting time extension request sent to the terminal:

communicating from the chip to the module a first signal indicating a waiting time extension request has been sent to the terminal;

initiating processing of a subset of one or more discrete operations at the module in response to the first signal;

communicating from the chip to the module a second signal in advance of the extended waiting time resulting from that extension request indicating a further waiting time extension request is scheduled for communication to the terminal;

stopping processing of the subset of discrete operations at the module in response to the second signal.

BRIEF DESCRIPTION OF FIGURES

The present invention will now be described by way of example with reference to the accompanying drawings. In the drawings.

DETAILED DESCRIPTION

Figure 1:
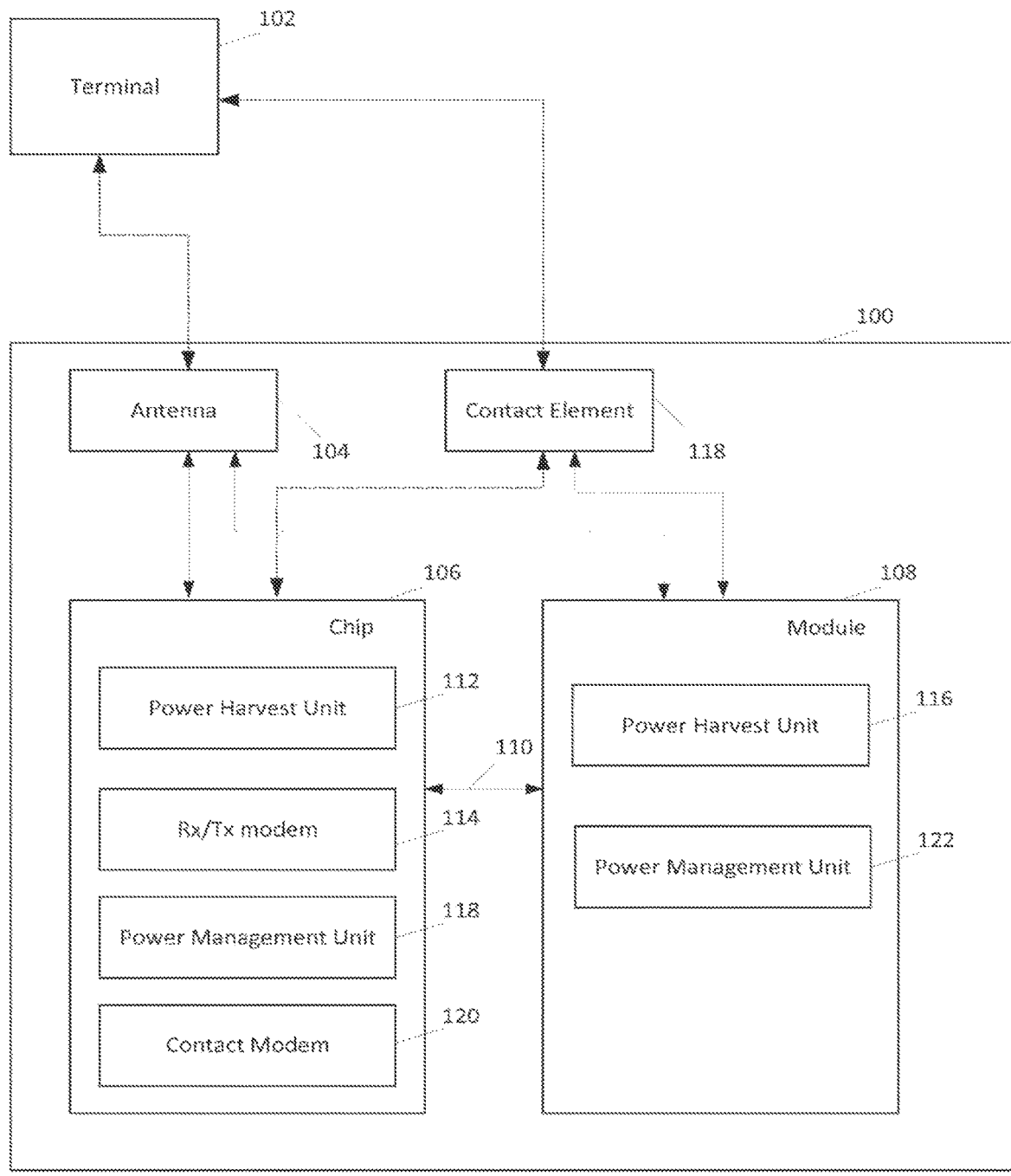
FIG. 1 shows an example architecture of a device that can undergo contactless and contact communication with a terminal.

The present disclosure is directed to a device for communication with a terminal. The device comprises an antenna for receiving a wireless signal emitted by the terminal; an embedded chip (e.g. an integrated circuit chip) and an additional embedded module. The device may be capable of operating in a contact and contactless mode of operation. The device could for example be a smart card, an ID card, a passport etc. The terminal may be a card reader, such as a point-of-sale (POS) terminal, a cash register, an ATM machine, a computer, a smartphone etc.

The chip generates data for communication to the terminal to perform a first function associated with the device. This first function may be a base, or primary function of the device. The chip could be, for example, a Secure Element. The module is configured to perform one or more processes, or steps, as part of a second function associated with the device. Thus, the device is a multi-function device. The second function may be implemented by both the chip and the module; that is, the processes required to perform the second function may be distributed across both the chip and the module; i.e. both the module and the chip may each perform one or more processing steps forming part of the second function. Alternatively, the processing steps required to perform the second function may all be performed by the module; i.e. the module may perform the second function. Furthermore, though the device has been described as performing two functions, it will be appreciated that the device may perform additional functions (it for example perform three, four, five etc. functions). In general, the device may perform a plurality of functions comprising a first function performed by the chip and a second function performed at least in part by the module.

In one particular implementation, the device is a smart card, such as bank or credit card, and the primary function is a type of banking functionality such as the performance of a financial transaction, e.g. making a purchase. Alternatively, the first function may be some other function requiring communication with a terminal, for example: providing physical access of the card user to a region of an environment (e.g. building access); identifying or authenticating a user; retrieval of personal user information (e.g. medical information and records) etc. The second function may consist of processing steps that do not require communication with a terminal to be performed. However, the performance of the second function may be requested by the terminal. The second function may for example be a type of biometric authentication. The biometric authentication may authenticate a user of the device to enable the completion of the first function (e.g. performing a financial transaction). In other examples, the second function may be the capture of an image of part of a user (e.g., for the purposes of biometric authentication); or may be a type of biometric enrolment. Other example implementations will be described in more detail below.

The chip is configured to communicate with the terminal in accordance with a contactless transmission protocol whereby a message, or command, sent by the terminal sets a specified waiting time for a response from the chip to maintain a connection with the terminal. The contactless transmission protocol may be specified by the ISO14443 and/or EMVCo® standards, for example. The chip can communicate requests to the terminal that extend the waiting time for response, but each request is to be sent prior to the expiry of the existing waiting time, otherwise the terminal assumes connection to the chip has failed. Thus, the transmission protocol governing communications between the chip and terminal may set timing restrictions on those communications. In particular, the contactless transmission protocol may be such that failure by the chip to respond to the terminal prior to the expiry of the specified waiting time (by communicating a waiting time extension request or some other message) causes the connection between the chip and terminal to fail (e.g. time out).

The module is configured to perform processing as part of performing the second function of the device. The processing may be formed of a number of processing steps. A processing step may take longer to complete than the waiting time interval set by the terminal (e.g. the time window between successive waiting time extension requests). Described herein are approaches for scheduling the processing performed by the module and the embedded chip to synchronise that processing with the waiting time extension requests sent by the embedded chip to the terminal. By suitably scheduling this processing the power consumption of the device can be effectively managed, and potential interference to the required communications between the terminal and embedded chip caused by the processing performed by the module can be reduced.

FIG. 1 shows an example device 100. Device 100 can communicate with terminal 102 through a contact or contactless interface. The device comprises an antenna 104, a chip 106, a module 108 and a contact element 118. The chip 106 is embedded within the device and could be, for example, a Secure Element, Module 108 may also be embedded within the device. In this example, the module is a physically distinct component from the chip 106; each of the chip 106 and module 108 may for example be implemented on respective integrated circuit chips embedded in the device. In other examples, the module 108 and chip 106 may be physically connected, but logically separate entities. The module 108 and chip 106 are connected to each other by one or more links, shown generally at 110. Each of the links may be a bus.

Device 100 communicates with terminal 102 (e.g. transmit messages to and/or receive messages from the terminal) through the antenna 104 when operating in a contactless mode, and through the contact element 118 when operating in a contact mode. In general, the device 100 may comprise one or more contact elements; one contact element is shown here for the purpose of clarity.

The contact element 118 is connected to the chip 106. The chip may be connected to the contact element by a conductive link. The contact element enables the device to communicate with the terminal through direct physical contact when the device is operating in a contact mode of operation. The contact element also provides electrical connectivity to the terminal when the device and terminal and brought into suitable physical contact. Thus, when the device is operating in contact mode, the chip receives power from the terminal through the contact elements. The device may communicate with the terminal in accordance with the ISO7816 standard when operating in contact mode.

In some arrangements, the contact element may be connected only to the chip. In these arrangements, the chip receives power from the terminal through the contact elements. The chip may then manage that received power to power its internal components and supply power to the module to power its internal components. In the arrangement shown in FIG. 1, the contact elements are connected to both the chip 106 and the module 108. Thus, both the chip and the module can receive power from the terminal through the contact elements when the device is in contact mode.

The antenna 104 is connected to both the chip 106 and module 108, for example by physical links such as a conductive element. In other arrangements, only the chip may be connected to the antenna.

Data is exchanged between the chip 106 and terminal 102 through the antenna 104 when the device 100 is operating in a contactless mode. When operating in contactless mode, the chip communicates with the terminal 102 in accordance with a transmission protocol whereby a message, or command sent by the terminal to the chip 106 sets an initial specified waiting time for a response. Communication with the terminal 102 within the waiting time may be required to maintain a connection between the device 100 and terminal 102. Failure to respond to the terminal 102 within the specified waiting time may cause the connection between the device and terminal to be lost, or reset. The waiting time may not be explicitly set by the protocol, but may be negotiated between the device 100 and terminal 102 in accordance with a formula specified by the protocol. The transmission protocol could for example be governed by the ISO14443 and/or the EMVCo® standard.

The chip 106 comprises a power harvest unit 112, a transceiver modem 114, a power management unit 118 and a contact modem 120. These components may be interconnected by a bus.

The power harvest unit 112 harvests power from the wireless signal emitted from the terminal received by the antenna 104 when the card is operating in contactless mode. The power-harvest unit 112 may for example induce a voltage from the received signal emitted by terminal 102. That induced voltage can be supplied to other components of the chip 106, and module 108. The wireless signal emitted from the terminal may be a radio-frequency signal governed by a radio communications standard. In one example, the wireless signal is an NFC signal.

The transceiver modem 114 manages the transmission of messages to and reception of messages from the terminal 102 when in contactless mode. The transceiver modem 114 may operate to manage the reception and transmission of those messages to comply with the standards governing the communication with the terminal. The modem 114 may also operate to extract data from a received wireless signal. The terminal 102 transfers data to the device 100 by modulating the signal it generates. The terminal may modulate the generated signal by means of amplitude modulation. The modem 114 may then extract data from the received wireless signal by demodulating amplitude variations of the voltage induced in the antenna caused by the amplitude modulation at the terminal 102.

The modem may transfer messages to the terminal by modulating data generated within the chip 106 onto the wireless signal emitted from the terminal 102. To do this, the modem 114 applies a modulated load to the antenna 104. Modulating the antenna load at the device 100 varies the power drawn from the received signal in accordance with the modulation. The variations in drawn power can be detected by the terminal 102 and interpreted as data.

The power management unit (PMU) 118 operates to manage, or control, the use of power (either harvested by the power harvest unit 112 in contactless mode or supplied through the contact element in contact mode) by components of the chip. The PMU 118 may control the power consumed by the other components of the chip to perform their tasks. In arrangements in which the module is not connected to the antenna 104 or contact elements 120, the PMU may also control the supply of harvested power from the chip 106 to the module 108.

The chip further comprises a contact modem 120 that manages the transmission of messages to and reception of messages from the terminal when operating in contact mode. The contact modem 120 may also ensure the communications between the chip and terminal satisfy any relevant standards (e.g. the ISO7816 standard) when the device operates in contact mode.

Module 108 comprises its own power harvest unit 116. The power harvest unit 116 is operable to harvest power from the signal received by the antenna 104 in contactless mode. Power harvested by unit 116 may be supplied to other components of the module 108 to power those components. By implementing this architecture, the module 108 can harvest power from the received signal independently of the chip 106, e.g. independently of the operation of the chip.

Module 108 may also include its own power management unit (PMU) 122 to manage, or control, the consumption of power (either harvested by the power harvest unit 116 in contactless mode or supplied through the contact element in contact mode) by components of the module. The module's PMU 122 may control the power consumed by the other components of the module 108 during their operation to perform their tasks. The module may not include a power harvest unit and/or power management unit in implementations in which only the chip is connected to the antenna.

The module 108 is configured to perform one or more processes as part of implementing a second function associated with the device 100, and is not constrained to respond to the terminal 102 within any specified waiting time. The second function may not require communication with the terminal 102; thus, in some examples, the module 108 may not communicate directly with the terminal at all—that is, only the chip communicates with the terminal. The module may be a biometric sensor module including one or more biometric sensors. The biometric sensor module may operate to perform biometric recognition or authentication of one or more biometric parameters including, for example: fingerprint recognition; iris recognition; vein recognition; retina recognition; voice recognition; behavioural recognition; facial recognition etc. Alternatively, the module may be a PIN, or password generator, a movement or a position sensor, a display screen, a status indicator or a data input mechanism such as a keyboard.

Device 100 and terminal 102 could take one of many different form factors. Device 100 could for example be a smart card, an ID card, a passport, a fob, a dongle, a security token (e.g. a USB token) etc. Alternatively, device 100 could be integrated into a communication device such as a mobile phone or smartphone; a wearable device, such as a bracelet, watch, a glove/pair of gloves, a pin (e.g. a brooch), a badge or some other contactless wearable device. The terminal 102 may be a card reader, such as a point-of-sale (POS) terminal, a cash register, an ATM machine, a computer, a smartphone etc.

In the examples that follow, the device 100 is taken to be smart card, the terminal 102 is a card reader and they are communicating in contactless mode. In particular, the device 100 may be a proximity integrated circuit card (PICC), and the terminal may be a proximity coupling device (PCD). Module 108 takes the form of a biometric sensor module that operates to perform biometric recognition or authentication of one or more biometric parameters. It may also perform biometric enrolment. Examples of types of biometric recognition include, for example, fingerprint recognition; iris recognition; vein recognition; retina recognition; voice recognition; behavioural recognition; facial recognition, etc. It will be appreciated that these implementations have been chosen for the purposes of illustration only, and the following examples can be applied equally to any alternative implementation mentioned in the foregoing.

Figure 2:
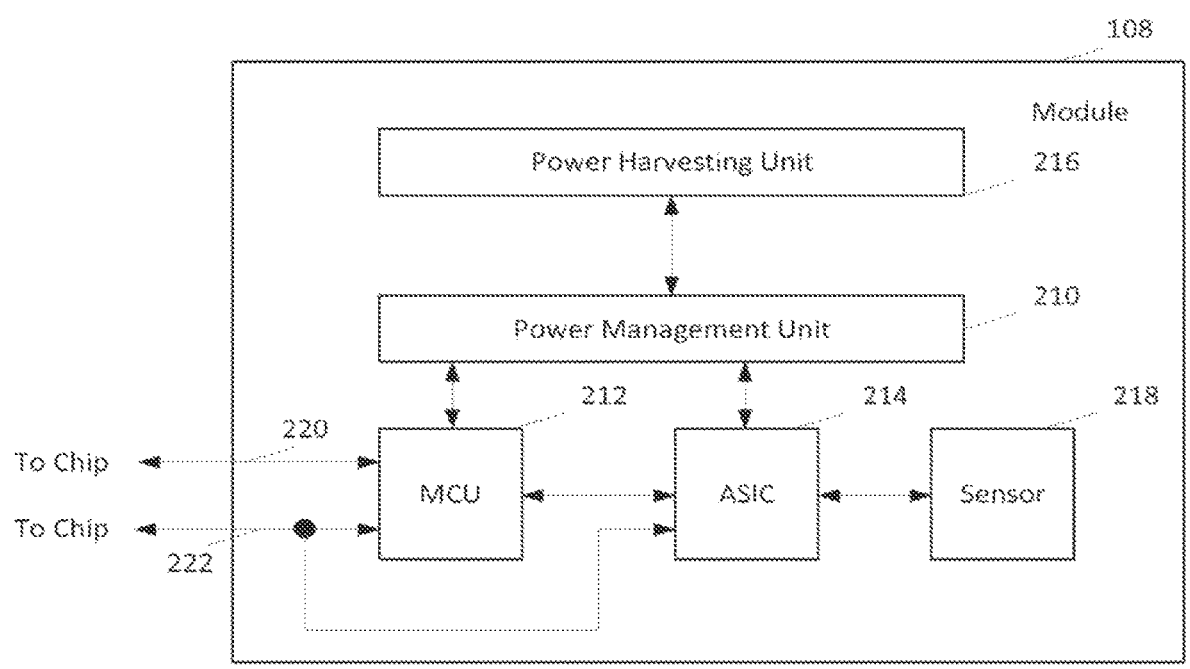
FIG. 2 shows an example module of the device shown in FIG. 1.

An example implementation of the module 108 as a biometric sensor module is shown in FIG. 2. The biometric sensor module operates to perform the second function of card 100, which in this example is biometrically identifying or authenticating a user of the card 100. The sensor module 108 comprises a power management unit 210, a microcontroller unit (MCU) 212, an application-specific integrated circuit (ASIC) 214, and a biometric sensor 218. The sensor module 108 may further optionally comprise a power harvesting unit 216 (e.g. if the card 100 adopts an architecture in which both the chip and module are connected to the antenna). The components of the sensor module 108 may be interconnected by a bus. Also shown in FIG. 2 are two communication links 220 and 222 that interconnect the module 108 and the chip 106. Links 220 and 222 may be physically and/or logically separate links. Link 220 and/or link 222 may be a physical link. Link 220 and/or link 222 could be an I²C bus or a Serial Peripheral Interface (SPI) bus.

The power management unit 210 manages, or controls, the power supplied to the components of the biometric sensor module 108. In this way, the power management unit 210 can control the power consumed by the other components of the sensor module. The power management unit 210 may be physically interconnected to each of the MCU 212, sensor 218 and ASIC 214. This allows the power management unit to control the power supplied to each of these components separately. The inclusion of the power management unit 210 within the sensor module 108 also enables the sensor module to control the power consumption of each of its internal components independently of the chip 106.

Sensor 218 is a biometric sensor for capturing one or more biometric parameters of the user. In some examples, the sensor may capture the biometric parameters by capturing images of a biometric source. Sensor 218 could be, for example, a fingerprint sensor (a single or double-sided sensor), a retina sensor, an iris sensor, a facial sensor etc.

The ASIC 214 controls the operation of the sensor 218. The ASIC may for example instruct the sensor to enter an acquisition mode in which the sensor captures data for a biometric parameter (e.g. a fingerprint pattern, retina pattern, iris pattern etc.). The ASIC may also receive data (e.g. image data) captured by the sensor 218 (e.g. during acquisition mode). The ASIC may communicate the captured biometric data to the MCU 212. The ASIC may also control the operating state of the sensor, for example by controlling when the sensor transitions between a low-power standby mode and the higher power acquisition mode.

The MCU 212 may perform biometric matching to compare data for a biometric parameter captured by the sensor 218 to stored template data. For example, if the data captured by the sensor is an image, the MCU may perform image matching to compare an image captured by the sensor 218 to a stored template image, or to stored template images. A template image is a trusted image. An image may be trusted in the sense it is taken to be of a biometric source belonging to the user of the card 100. To perform the image matching, the MCU may perform feature extraction on the captured image to identify a set of one or more extracted features. The extracted features are then compared with the features of the template image to determine if the captured image matches the template image. The MCU may for example compare the features of the images to determine a matcher score for the captured image. The captured image may be taken to match the template image if the matcher score is above a predetermined threshold.

The MCU may communicate an indication that the captured biometric parameter data matches the template data to the chip 106. The chip 106 can then communicate an indication that the user of the card has been authenticated back to the reader 102. The authentication of the card user may enable the primary function associated with the card 100 to be completed. Alternatively, the MCU may communicate to the secure element 106 that the captured biometric parameter data does not match the template data, in which case the user of the card has not been authenticated and primary function associated with the card 100 may not proceed, or may proceed in an altered fashion as a consequence of there being no match. This is an example of an implementation in which each stage, or process, of the biometric authentication is performed by the module 108.

In an alternative implementation, the process of performing the image matching may be performed by the chip 106, rather than by the module 108. This is an example of an implementation in which the processes of biometric authentication are performed by both the chip 106 and the module 108; i.e. the biometric authentication is not performed solely by the module 108.

The MCU 212 may also be configured to control the operative state of the ASIC 214. For example, the MCU may control the transition of the ASIC between a low-powered standby mode and a high-powered active mode.

Figure 3:
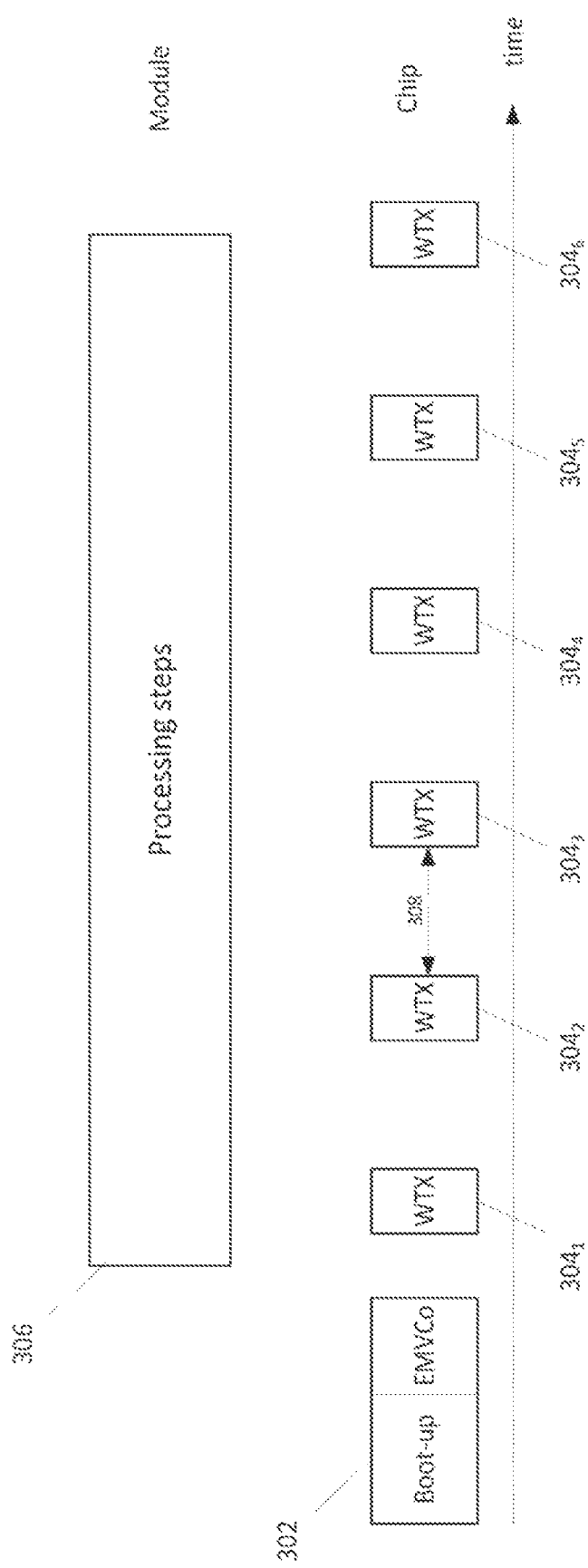
FIG. 3 shows a timing diagram of the operation of the chip and module of the device shown in FIGS. 1 and 2 in an example implementation.

FIG. 3 is a schematic timing diagram illustrating the operation of the module 108 and the chip 106.

When device 100 is operating in a contactless mode of operation, chip 106 communicates with the terminal 102 in accordance with the ISO14443 and EMVCo® standards. These standards specify that the terminal, having sent a command to the chip 106, sets an initial waiting time (known as the frame waiting time (FWT)) for a response from the chip. The FWT is the maximum amount of time permitted for the chip to initiate sending a response back to the terminal. Failure by the chip to send a response to the terminal within the FWT may result in the communication connection between chip and terminal being lost, for example timed out. The value of the FWT can be negotiated between the device 100 and the terminal 102. The chip 106 can communicate a waiting time extension request to the terminal 102. The waiting time extension request may be denoted S(WTX). In response to receiving the waiting time extension request, the terminal extends the waiting time for a response from the chip. The device may extend the waiting time by the frame waiting time FWT (i.e., it may extend the waiting time by an amount equal to the initial waiting time). A waiting time extension request may be made at any time before the expiry of the current waiting time.

The timing restrictions imposed by the ISO14443 and EMVCo® standards are illustrated schematically in FIG. 3. Block 302 denotes the boot-up of the chip 106 and module 108 and communication with the terminal in accordance with the EMVCo® standard. The series of waiting time extension requests communicated from the chip to the terminal 102 are denoted $304_{1-6}$. The time period in which the terminal expects a response from the chip 106 may be referred to as a waiting time interval. The waiting time interval is the time period between successive communications between the device 100 and terminal 102 imposed by timing restrictions of the standard governing those communications. The waiting time interval is a time period in which a communication (e.g. a response to the command issued by the terminal 102, or a waiting time extension request) is to be sent from the chip to the terminal 102 to maintain the communication connection. The waiting time interval may therefore be the time period between the time the command was received from the terminal and the initial specified waiting time, or the time period between making a waiting time extension request and the new extended waiting time resulting from that request. That is, the waiting time interval may be viewed as the time period between two scheduled communications between the chip and the terminal. In this example, the waiting time interval is equal to the frame waiting time FWT. An example waiting time interval is shown at 308.

Module 108 operates to perform at least part of the second device function of biometric authentication. The performance of this function may be requested by the terminal.

The function, and thus the processing performed by the module, may be partitioned into a number of processing steps, for example: image acquisition using the biometric sensor; image transferal to the MCU 212; image pre-processing and biometric feature extraction at the MCU; feature matching against one or more templates at the MCU; and communicating the result of the feature matching to the chip.

A set of processing steps to be performed by the module 108 are illustrated in FIG. 3 by block 306. As shown, the time required by the module to perform the processing steps may exceed the waiting time interval. In some cases, it is possible for the duration of the processing steps to span several waiting time intervals.

It has been appreciated that it is desirable for the module 108 not to perform its processing during the time periods the chip is communicating with the terminal 102. This is for two main reasons. Firstly, when the device is operating in a contactless mode of operation, the power that can be harvested from the received signal emitted from the terminal may be limited. The power that can be harvested is prioritised to support the scheduled communications with the terminal 102 necessitated by the standards the device 100 is operating in compliance with. Secondly, power drawn by the module 108 during periods the chip is communicating with the terminal affects the load modulation of the signal emitted by the terminal, which can appear as extra noise to the terminal. In other words, power drawn by the module may cause interference in the communications between the chip and terminal.

To avoid these problems, the processing steps 306 performed by the module 108 are further partitioned into a plurality of discrete operations, or tasks. Each task may take a reduced amount of time to complete than the processing step of which it forms part. Processing performed by the module 108 can be started or paused on the boundaries between discrete operations. In other words, processing performed by the module may be paused upon completion of a discrete task, and resumed by processing a subsequent discrete task. It is possible for the processes 306 performed by the module to be partitioned into discrete tasks with varying degrees of granularity. For example, a discrete operation may refer to one of the authentication steps described above (e.g. image acquisition). Alternatively, a discrete operation may be a combination of authentication steps, or part of an authentication step (e.g., each authentication step may be formed of a plurality of discrete operations).

The device 100 then operates to synchronise the processing of these discrete operations with the scheduled communications between the device 100 and terminal 102 (which in this example, are the waiting time extension requests S(WTX)). The device performs this synchronisation so that the discrete operations are performed within the waiting time intervals and are not performed during the periods the device 100 is communicating with the terminal 102. That is, the discrete operations are performed in the time intervals between the scheduled communications between the device 100 and terminal 102.

Three approaches for performing this synchronisation will now be described. Each synchronisation process will be described for the initial bootup process as the device 100 is brought into proximity of the terminal 102, and for a subsequent time following boot up. For each of these synchronisation approaches, reference is made to the chip and module transitioning between a low-powered state and an active state. A low-powered state refers to a state in which a component of the device (e.g., the chip, the module, a module component etc.) consumes minimal power. A component may not be able to perform its full functionality when in the low-powered state, yet is not fully inactive (as it may be, for instance, before boot-up). A low-power state may be referred to as a standby state. An active state may refer to a state of a component in which the component consumes more power than when in the low-power state. A component may be capable of performing its full functionality when in the active state.

In each of the synchronisation approaches discussed, the general principle illustrated by the accompanying figures is that as soon as a device component could be put into a low power state, for example, because it is not required for subsequent operations, then that component should be put in a low power state, or should become fully inactive. Taking this action increases the power budget available to the remaining components that need to be operating. When that component is needed once more, it should be returned from the low power or inactive state to the active state, in time for it to perform its required operation.

Although this is the approach illustrated, alternative approaches are considered where components may remain in an active state if they are not involved in a current operation. The choice of approach may depend on the architecture of the smart card, for example whether the chip and module can operate independently, the availability of lines to signal states between the chip and module and their various internal components, together with the availability of harvested power compared to the power budget that is required at any time by the various components that may be operating.

Figure 4:
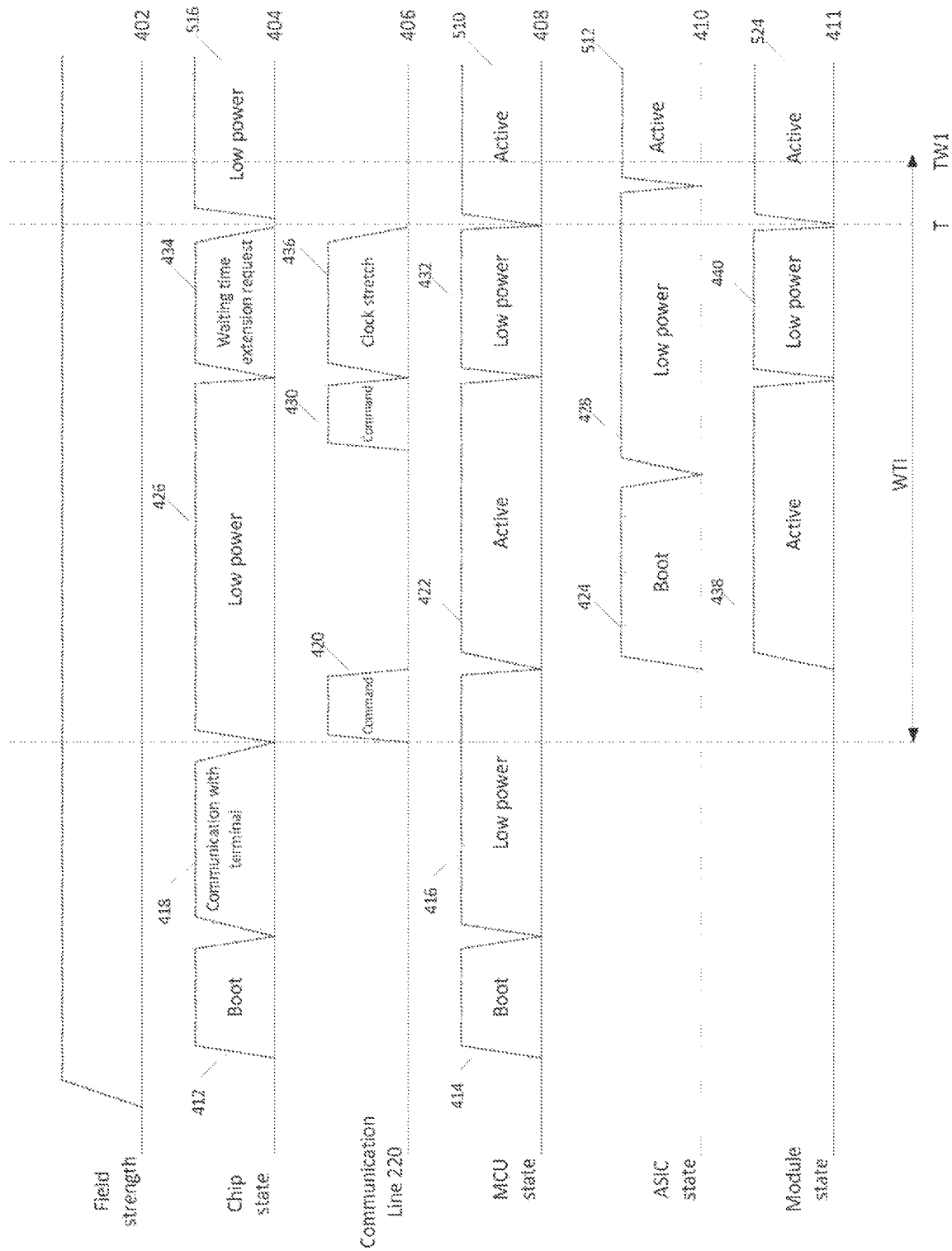
FIG. 4 shows a timing diagram illustrating a first synchronisation technique during boot-up of the module.

FIG. 4 shows a timing diagram illustrating the first synchronisation approach during the bootup process. Time is represented along the x-axis. Line 402 shows the field strength of the signal emitted from the terminal as received by the device 100 as the device is brought into proximity of the terminal and remains in range. Line 404 represents the state of the chip 106; line 406 illustrates communications along communication line 220 between the chip 106 and module 108. Line 408 represents the state of the module's MCU 212; line 410 represents the state of the module's ASIC 214 and line 411 represents the general state of the module 108. The module 108 is taken to be in an active state when at least one of its components is in an active state, and in a low powered state when all of its components are in a low powered state. For example, when the MCU is in the active state (block 422), the module is said to be in an active state (denoted by block 438 on line 411). When both the MCU and ASIC have powered down to the low powered state, the module is also in a low power state (denoted by block 440 on line 411).

The power management units of the chip 106 and module 108 measure the induced voltage from the signal emitted from the terminal 102. When the measured voltage increases beyond a specified voltage, the chip 106 and the module's MCU 212 boot-up, illustrated by blocks 412 and 414 respectively. The chip 106 and MCU 212 boot-up concurrently but independently of each other as the device 100 is brought into range of the terminal. This conveniently removes the need for the chip 106 to control the bootup of the MCU 212, which can remove the need for a dedicated control signal and simplify the design of the power management unit of the chip and module.

Following bootup, the MCU 212 enters a low-power state, illustrated at block 416. The chip 106 receives a communication from the terminal 102, illustrated by block 418.

This communication is in accordance with the EMVCo® and ISO14443 standards. During this communication, the MCU is in a low power state and the ASIC has yet to be powered up and thus power drawn by the module is kept to a minimum, thereby reducing interference in the communications between the chip and terminal. The communication from the terminal 102 may be a command. That command might be a request for some function, or process, to be performed, such as an identify authentication and/or enrolment of the device user. In the context of this example, the requested function is a biometric authentication or enrolment.

The communication 418 from the terminal 102 sets an initial waiting time for a response to the terminal. That initial waiting time is denoted TW1. The time period between the completion of communication 418 and the initial waiting time defines a waiting time interval WTI. Within this waiting time interval, either a request for a waiting time extension or a response to the terminal is to be sent from the chip 106 to the terminal 102 to avoid connection to the terminal being lost.

In response to completing the communication 418 with the terminal, the chip 106 indicates to the module 108 that it should transition out of its low powered state and carry out processing as part of performing the function requested by the terminal. The chip may do this by sending a 'command' signal to the module along communication line 220 (shown by block 420). Command 420 may be a request for the module to perform a biometric authentication process, or more generally a request to perform at least part of a biometric authentication process. The command 420 also indicates the start of the waiting time interval. The module may start an internal timer in response to receiving the command 420.

If the chip is not required for subsequent operations by the module within the waiting time interval, it may transition to a low power state (shown by block 426) following issuance of the command 420. For example, if the module is capable of harvesting and managing its own power and hence operating independently of the chip due to the device architecture discussed in FIG. 1, then the chip may enter a low power state since it is not required by the module to be in an active state during the waiting time interval. Alternatively, if the device architecture is such that the module requires the chip to manage its power supply, or if the module requires the chip to participate in its processing over the waiting time interval, then the chip remains in an active state. In a further alternative, if the available power is greater than or equal to the power budget required by the chip and the module, then the chip may remain in an active state.

The command signal 420 is received at the module's MCU 212. In response to receiving the signal 420, the MCU 212 transitions out of its low power state (illustrated by block 422).

The MCU 212 may start a timer in response to receiving the command 420 indicating the start of the waiting time interval WTI. The MCU may further be programmed to know the waiting time interval, and may select a subset of one or more discrete operations to be performed within the waiting time interval, subject to sufficient harvested power (402) continuing to be available. In other words, the MCU 212 may identify a subset of one or more discrete operations to be performed in dependence on the waiting time interval. That subset of one or more discrete operations may be performed by the MCU, the ASIC (allocated by the MCU), a combination of both the MCU and ASIC or some other component of the module. The discrete operations may form part of one of the biometric authentication steps described above. For the purposes of illustration, in this example the discrete operations form part of the processing steps involved in booting the ASIC 214, for example, bootloading, firmware initialisation, calibration and tuning. Thus, the MCU 212, having transitioned to an active state, schedules a subset of discrete operations to start to boot the module's ASIC 214 at block 424. That is, command 420 triggers the boot of the module's ASIC.

It is convenient if the boot of the module's ASIC can be entirely completed within the agreed waiting time interval WTI, though in some instances the processing step of booting the ASIC may span multiple waiting time intervals. In the example illustrated in FIG. 4, it is assumed that the module completes the boot of the ASIC within the illustrated waiting time interval. To increase the likelihood that the bootup of the ASIC 214 can be completed within the waiting time interval WTI, the chip 100 may be configured to send the command 420 immediately following the completion of the communication with the terminal 418.

Upon completion of its allocated subset of discrete operations, the ASIC transitions to a low power state, shown at block 428. In response to the ASIC completing its operations and transitioning to a low powered state, the module's MCU 212 signals a command 430 to the chip 106 and itself transitions to a low powered state 432. Since both the MCU and ASIC have powered down to the low powered state, the module 108 is in a low power state (denoted by block 440 on line 412), thus power drawn by the module that may result in interference in the communications between the chip and terminal is kept to a minimum.

Command 430 may indicate to the chip 106 that the module 108 has completed its allocated subset of discrete operations. Command 430 may therefore indicate to the chip 106 that a transmission to the terminal 102 can be made. Thus, in response to receiving the command 430, the chip 106 sends a waiting time extension request 434 to the terminal 102. It is noted that if the chip had previously transitioned to a low powered state (as shown at block 426), receipt of command 430 may also cause the chip to transition out of the low powered state to enable it to communicate the waiting time extension request 434.

The chip 106 indicates to the module 108 that the transmission of the waiting time extension request to the terminal is in progress. In one example, the chip does this by clock stretching on the communication line 220. The rising edge of the clock stretching denotes the start of the transmission of the waiting time extension request. This is shown at block 436.

Because the chip sends a waiting time extension request to the terminal 102 in response to receiving the command 430, the command 430 synchronises the operation of the module 108 with the operation of the chip 106. The chip 106 has until the expiry of the waiting time interval (i.e., until the initial waiting time TW1) to send the request for a waiting time extension. However, because the ASIC completes its allocated set of discrete operations before the expiry of the waiting time interval, the command 430 enables the module to signal to the chip to optionally send the request for a waiting time extension in advance of the initial waiting time TW1. This reduces overhead in the system to a minimum. In the illustrated example, the communication of the waiting time extension request is completed by time T, prior to time TW1.

Figure 5:
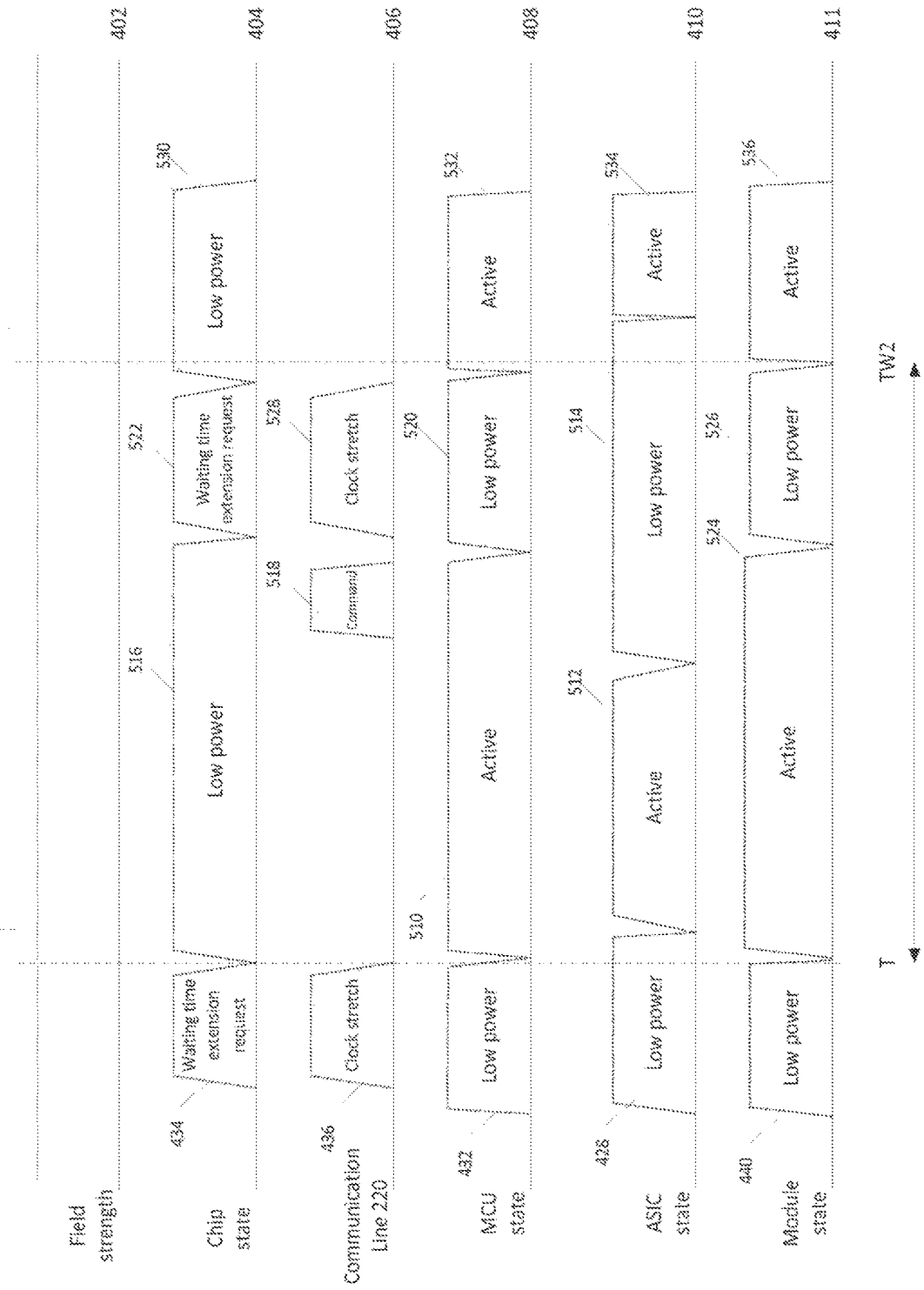
FIG. 5 shows a timing diagram illustrating the first synchronisation technique at a subsequent stage to boot-up.

FIG. 5 shows a timing diagram illustrating the first synchronisation approach during the operation of the device 100 following the initialisation of the bootup process of the module 108 shown in FIG. 4.

In response to completing the waiting time extension request, the chip 106 indicates to the module 108 that the transmission of the waiting time extension request 434 is complete. The chip may do this by lifting the clock stretching on the communication line to the module (block 436). The falling edge of the clock stretching denotes the end of the transmission of the waiting time extension request.

The completion of the waiting time extension request 434 sets an extended waiting time TW2 for a further communication to the terminal 102. Thus, the completion of the waiting time extension request 434 sets a waiting time interval WTI defining a period of time in which the chip 106 is to send a further communication to the terminal. If the chip is not required for subsequent operations by the module during the new waiting time interval, the chip 106 may transition to a low power state following the completion of the waiting time extension request 434 (block 516), otherwise the chip may remain in an active state.

In response to the chip indicating the transmission of the waiting time request has been completed, the module's MCU 212 transitions out of the low power state into an active state (block 510).

After transitioning to the active state, the MCU 212 may start a timer at the beginning of waiting time interval and may be programmed to know the waiting time interval. The MCU may then select a subset of one or more discrete operations to be performed within the waiting time interval, subject to sufficient harvested power (402) continuing to be available. In other words, the MCU 212 may identify a subset of one or more discrete operations to be performed in dependence on the waiting time interval. That subset of one or more discrete operations may be performed by the MCU, the ASIC (allocated by the MCU), a combination of both the MCU and ASIC or some other component of the module. The discrete operations may form part of one of the biometric authentication steps described above. For the purposes of illustration, in this example the subset of discrete operations are acquiring a portion of an image using the sensor 218 under the control of the ASIC 214. Thus, the MCU 212, having transitioned to an active state, signals to the ASIC 214 to transition from its low powered state to an active state (block 512). The ASIC, having transitioned to an active state, performs its allocated set of one or more discrete operations in block 512.

Upon completion of its allocated subset of discrete operations, the ASIC transitions to a low powered state (block 514). The MCU detects the ASIC has transitioned to the low power state and in response determines whether its processing (i.e. all of its discrete operations) is complete. In this example, it is assumed that the processing is not complete, and so the MCU sends command 518 to the chip 106, and following sending that command, itself transitions to a low power state (block 520).

Command 518 may indicate to the chip 106 that the module 108 has completed its allocated subset of discrete operations and/or that the module is in a low-powered state. Command 518 may therefore indicate to the chip 106 that a transmission to the terminal 102 can be made. Thus, in response to receiving the command 518 the chip 106 may send a waiting time extension request 522 to the terminal 102.

Command 518 therefore synchronises the operation of the module 108 (and in particular, the performance of discrete operations) with the communications from the chip 106 to the terminal 102. It is noted that the chip 106 has until the expiry of the waiting time interval (i.e., until the extended waiting time TW2) to send the request for a waiting time extension. But because the module completes its subset of one of discrete operations within the waiting time interval (i.e., before the expiry of the waiting time interval), command 518 sent from the module to the chip enables the chip to transmit the waiting time extension request in advance of the extended waiting time TW2.

In other examples, the subset of discrete operations to be performed within the waiting time interval may be performed by the MCU. In this case, the MCU may not activate the ASIC during the waiting time interval. Instead, the MCU may process its subset of discrete operations and, upon completion of the subset within the waiting time interval, send the command 518 to the chip 106 before transitioning to a low powered state.

Block 524 denotes the module being in an active state during the time period in which at least one component of the module is in an active state. Block 526 denotes the module being in a low powered state when all its components are in a low powered state.

As above, the chip 106 indicates to the module 108 that the transmission of the waiting time extension request 522 is in progress by lifting the clock stretching on the communication line to the module (block 528). In response to completing the waiting time extension request, the chip 106 indicates to the module 108 that the communication has completed by stopping the clock stretching 528 on the communication line 220. The falling edge of clock stretching denotes the end of the transmission of the waiting time extension, indicating to the module that it may resume operations to complete the processes 306, denoted by blocks 532, 534 and 536.

If the chip is not required for subsequent operations by the module during the waiting time interval resulting from the communication of the extension request 522, the chip 106 may transition to a low power state (block 530), otherwise the chip may remain in an active state.

Figure 6:
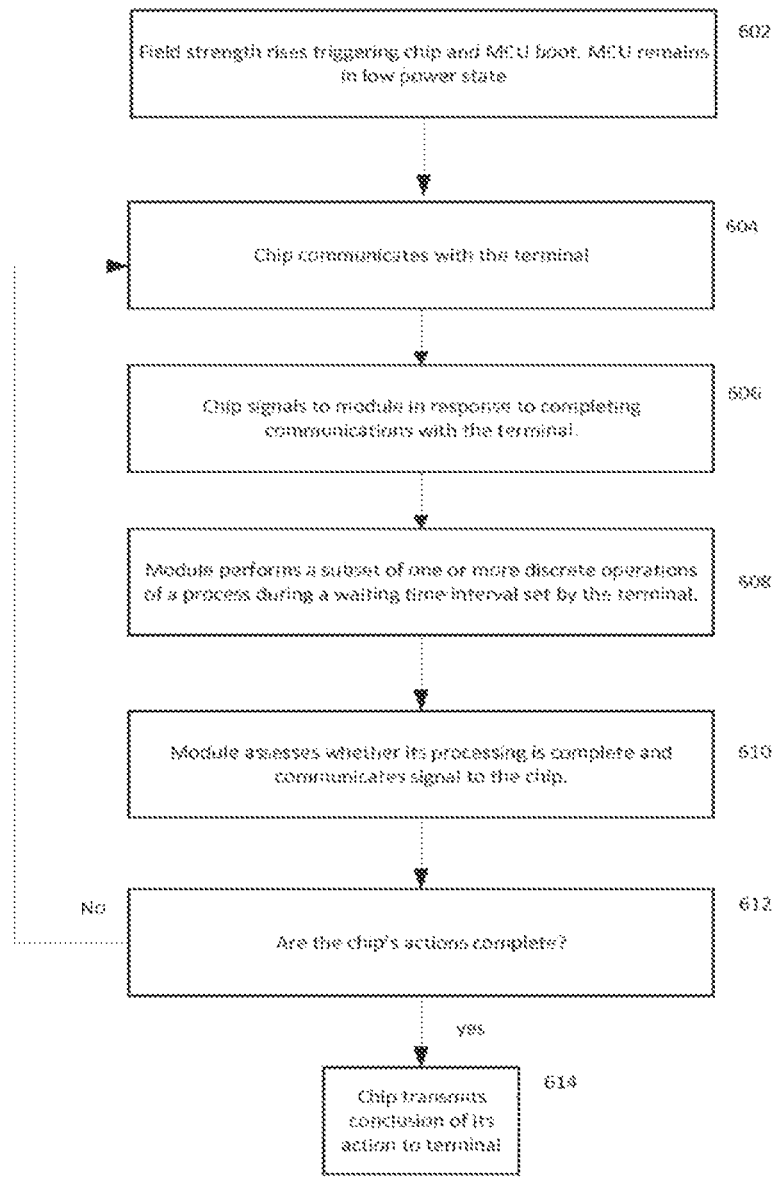
FIG. 6 shows a flowchart illustrating the steps of the first synchronisation technique.

The first synchronisation process implemented by the device 100 can be summarised by the flowchart in FIG. 6.

At step 602, the device is brought in range of the terminal such that the field strength rises above a specified threshold, triggering the chip 106 and MCU 212 to boot up. The MCU may remain in a low power state following bootup.

At step 604, the chip 106 enters an active state and communicates with the terminal 102. The first time through the loop shown in FIG. 6, the communication involves the chip receiving a command from the terminal, setting an initial waiting time for a response. The command from the terminal may be a request for a function (e.g. biometric authentication or enrolment) to be performed. For subsequent passes through the loop, at step 604 the chip sends a request to the terminal to extend the waiting time for response. The transmission of the waiting time extension request to the terminal may be initiated before the expiry of the previous waiting time interval.

During step 604, the chip may indicate to the module that the communication with the terminal is in progress (e.g. by clock stretching on the communication line 220).

At step 606, the chip 106 signals to the module indicating communications with the terminal are complete. For the first pass through the steps shown in FIG. 6, the chip may do this by sending a command over communication line 220 requesting that the module perform processing as part of performing the process requested by the terminal. For subsequent passes through the steps shown in FIG. 6, the chip may do this by lifting the clock stretching on the communication line 220. Completion of this communication sets a new waiting time interval in which a subsequent communication is to be sent to the terminal. In response to the completion of the communication with the terminal, the module transitions to an active state and optionally starts an internal timer for the start of the waiting time interval. Optionally, the chip may enter a low power state after signalling to the module.

At step 608, the module performs a subset of one or more discrete operations forming part of the process during the waiting time interval set by the terminal. The module may determine the subset of discrete operations to be performed in dependence on the length of the waiting time interval and/or the level of available power harvested from the signal emitted from the terminal 102. In the example described above, the subset of discrete operations was determined by the MCU and allocated to the ASIC.

At step 610, the module determines whether its processing is complete. That is, the module determines whether all the discrete operations forming the processing steps 306 it is to perform have been completed. This determination may be performed by the MCU. Processing may be complete when the module has performed all its allocated processing steps required to implement the second function of the device. The module then sends a command to the chip in dependence on that determination. The module sends a first type of command in response to determining that the processing is not complete, and a second type of command in response to determining that the processing is complete. The first type of command indicates that processing is not complete, and the second type of command indicates that processing is complete. Command 518 in FIG. 5 is an example of a command of the first type. The second type of command may indicate the outcome, or result, of the processing performed by the module. For example, if the module performs each step of the biometric authentication, the second type of command may contain the result of the authentication (i.e. whether the device user is authenticated or not). For implementations where the image matching is performed by the chip, the second type of command may contain data for the captured image to enable the chip to perform the image matching, e.g. data representing the captured image or data representing extracted features from the captured image. Both the first and second type of commands may be communicated over communication line 220.

After communicating the command to the chip, the module transitions to a low power state. The command may indicate to the chip that the module is in a low-power state.

At step 612 the chip determines whether its actions are complete. The chip may for example determine whether the function requested by the terminal at step 604 is complete. The chip may determine that its actions are complete when the function requested by the terminal has been completed. Put another way, the chip determines whether further waiting time extension requests are required.

The chip may determine that the function requested by the terminal is not complete (and thus that a further waiting time extension request is required) in response to receiving a first type of command from the module at step 610. Receipt of a second type of command from the module at step 610 does not necessarily mean that no further waiting time extension requests are needed. For example, if both the chip and module perform processing steps to perform the function requested by the terminal, receipt of the second type of command indicates the module has completed its allocated processing steps but does not mean that chip has completed its allocated processing steps. In some implementations, the processing steps are allocated to the chip and module in such a way that the chip cannot perform its processing steps until the module has completed its processing steps. An example of this is where the steps of biometric image capturing are performed by the module, but the steps of image feature extraction and/or image matching are performed by the chip. Thus, the second type of command may indicate that the chip is to perform its processing steps to perform the requested function.

If the chip determines that its actions are not complete the method returns to step 604, where the chip communicates a waiting time extension request to the terminal. If the module has yet to complete its processing, steps 606, 608, 610 and 612 are repeated until the module's processing is complete. If the module's processing is complete but the chip's actions are not yet complete, then the chip may proceed to perform its processing in waiting time intervals between successive waiting time extension requests being sent to the terminal until its actions are complete.

If the chip determines at step 612 that its actions are complete, the method proceeds to step 614, where the chip communicates a message to the terminal indicating the conclusion of its action. The message may indicate the function requested by the terminal has been completed. It may additionally indicate the outcome of the function (e.g. whether the user of the device has been authenticated or not). Having communicated the message to the terminal, the chip may enter a low power state. Further waiting time extension requests might not be sent when the chip determines its actions are complete.

Thus, in summary, for each waiting time interval set by a communication from the chip to the terminal, the chip signals to the module indicating that communication to the terminal is complete. In response, the module identifies and begins processing a subset of discrete operations. In response to completing that subset of operations within the waiting time interval, the module sends a command to the chip prior to the expiry of the waiting time interval, the command causing the chip to send a waiting time extension request to the terminal if it is determined the module has not completed its processing. The waiting time extension request then sets a further waiting time interval.

The second synchronisation approach will now be described.

Figure 7:
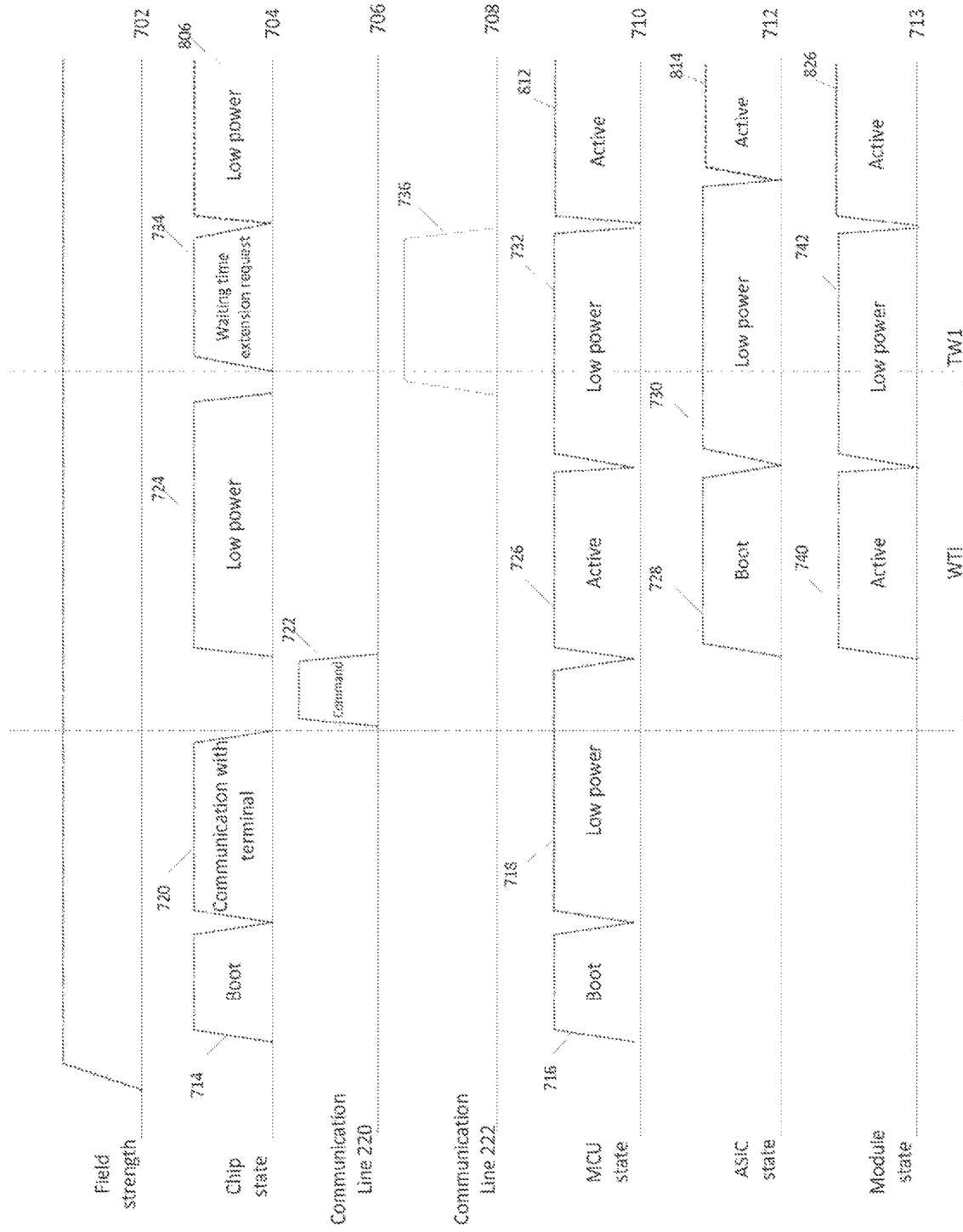
FIG. 7 shows a timing diagram illustrating the second synchronisation technique during boot-up of the module.

FIG. 7 is a timing diagram illustrating the second synchronisation approach during the bootup process. Time is again represented along the x-axis. Line 702 shows the field strength of the signal emitted from the terminal as received by the device 100 as the device is brought into proximity of the terminal and remains in range. Line 704 represents the state of the chip 106; line 706 illustrates communications along communication line 220 between the chip 106 and module 108. Line 708 represents the state of communication line 222 between the chip 106 and module 108. Communication line 222 may be a physical link. It may be a separate line to the first communication line (physically and/or logically). Line 710 represents the state of the module's MCU 212; line 712 represents the state of the module's ASIC 214 and line 713 the general state of the module. The module 108 is taken to be in an active state on line 713 when at least one of its components is in an active state, and in a low powered state on line 713 when all of its components are in a low powered state.

As described before, the power management units of the chip 106 and module measure the induced voltage from the signal emitted from the terminal 102. When the measured voltage increases beyond a specified voltage, the chip 106 and the module's MCU 212 boot-up, illustrated by blocks 714 and 716 respectively. The chip 106 and MCU 212 boot-up concurrently but independently of each other as the device 100 is brought into range of the terminal.

Following bootup, the MCU 212 enters a low-power state, illustrated at block 718. The chip 106 then communicates with the terminal 102, illustrated by block 720. This communication is in accordance with the EMVCo® and ISO14443 standards. During this communication, the MCU is in a low power state and the ASIC has yet to be powered up and thus power drawn by the module is kept to a minimum, thereby reducing interference in the communications between the chip and terminal. Communication 720 is analogous to communication 418 shown in FIG. 4 and described above.

The communication 720 from the terminal 102 sets an initial waiting time for a response to the terminal. That initial waiting time is denoted TW1. The time period between the communication 720 and the initial waiting time defines a waiting time interval WTI. Within this waiting time interval, either a request for a waiting time extension or a response to the terminal is to be sent from the chip 106 to the terminal 102 to avoid connection to the terminal being lost.

In response to completing the communication 720 with the terminal, the chip 106 indicates to the module that it should transition out of its low powered state and carry out processing as part of performing the function requested by the terminal. The chip may do this by sending a 'command' signal to the module (shown by block 722). Command 722 may be a request for the module to perform a biometric authentication process, or more generally a request to perform at least part of a biometric authentication process. The indication is sent from the chip to the module over communication line 220. The command also indicates the start of the waiting time interval.

If the chip is not required for subsequent operations by the module within the waiting time interval, it may transition to a low power state (shown by block 724) following issuance of the command 722. For example, if the module is capable of harvesting and managing its own power and hence operating independently of the chip due to the device architecture discussed in FIG. 1, then the chip may enter a low power state since it is not required by the module to be in an active state during the waiting time interval. Alternatively, if the device architecture is such that the module requires the chip to manage its power supply, or if the module requires the chip to participate in its processing over the waiting time interval, then the chip remains in an active state during the waiting time interval. In a further alternative, if the available power is greater than or equal to the power budget required by the chip and the module, then the chip may remain in an active state.

The command signal 722 is received at the module's MCU 212. In response to receiving the signal 722, the MCU 212 transitions out of its low power state (illustrated by block 726).

The MCU 212 may start a timer in response to receiving the command 722 indicating the start of the waiting time interval WTI. The MCU may further be programmed to know the waiting time interval, and may select a subset of one or more discrete operations to be performed within the waiting time interval, subject to sufficient harvested power (702) continuing to be available. In other words, the MCU 212 may identify a subset of one or more discrete operations to be performed in dependence on the waiting time interval. That subset of one or more discrete operations may be performed by the MCU, the ASIC (allocated by the MCU), a combination of both the MCU and ASIC or some other component of the module. The discrete operations may form part of one of the biometric authentication steps described above. For the purposes of illustration, in this example the discrete operations form part of the processing steps involved in booting the ASIC 214, for example, bootloading, firmware initialisation, calibration and tuning. Thus, the MCU 212, having transitioned to an active state, schedules a subset of discrete operations to start to boot the module's ASIC 214 at block 728. That is, signal 722 triggers the boot of the module's ASIC.

It is convenient if the boot of the ASIC can be entirely completed within the agreed waiting time interval WTI, though in some instances the processing step of booting the ASIC may span multiple waiting time intervals separated by extension requests. In the example illustrated in FIG. 7, it is assumed that the module completes the boot of the ASIC within the illustrated waiting time interval. To increase the likelihood that the bootup of the ASIC 214 can be completed within the waiting time interval WTI, the chip 100 may be configured to send the command 722 immediately following the completion of the communication with the terminal 720.

Upon completion of its allocated subset of discrete operations, the ASIC transitions to a low power state, shown at block 730. In response to the ASIC completing its operations and transitioning to a low powered state, the module's MCU itself transitions to a low powered state 732. Since both the MCU and ASIC have powered down to the low powered state, the module 108 is in a low power state (denoted by block 742 on line 713), thus power drawn by the module that may result in interference in the communications between the chip and terminal is kept to a minimum.

Prior to the chip transmitting the waiting time extension request 734 to the terminal, the chip signals to the module that a waiting time extension request is to be sent. This signal is communicated over communication line 222. In this example, the chip signals that a waiting time extension request is to be sent by changing the state of communication line 222 from a first state to a second state. This is illustrated at 736. The module 108 may be configured to interpret the change of state (in this example, the rising edge of the state) as the signal that a waiting time extension request is to be sent. The state of communication line 222 may be the voltage level of the line. The first state may be associated with a first voltage level, and the second state associated with a second voltage level.

The chip may signal to the module that a waiting time extension request is to be sent a specified amount of time prior to the transmission of that request. In other words, the chip may change the state of communication line 222 a specified amount of time before the request is sent. This is to provide the module with a time window in which it is to complete or stop the discrete operation it is processing and transition to a low powered state prior to the transmission of the waiting time extension request.

If the chip has transitioned to a low power state following the previous communication with the terminal 720, then it transitions to an active state prior to communicating the signal 736 to the module. The chip may include an internal timer to set the transition from the low powered state to the active state a predetermined amount of time before the expiry of the waiting time interval.

When the transmission of the waiting time extension request 734 has been completed, the chip 106 signals to the module 108 that the waiting time extension request has been sent. In this example, the chip does this by changing the state of communication line 222 from the second state back to the first state. The module 108 is configured to interpret the change of state (in this example, the falling edge of the state)

as the signal that a waiting time extension request has been sent. This indicates to the module that it may resume operations. The second synchronisation approach therefore uses signals from the chip 106 to the module 108 to synchronise the operation of the module to the chip.

If the chip is not required for subsequent operations by the module, the chip 106 may transition to a low power state following completion of the communication with the terminal (shown by block 806).

Subsequent operations may occur (shown by blocks 812, 814 and 826), depending on the process that was commanded by the chip (block 722). For example, following boot up of the biometric module and chip, the process 306 that they may have been requested to carry out is to authenticate the card user for a payment, requiring a biometric image to be captured.

Figure 8:
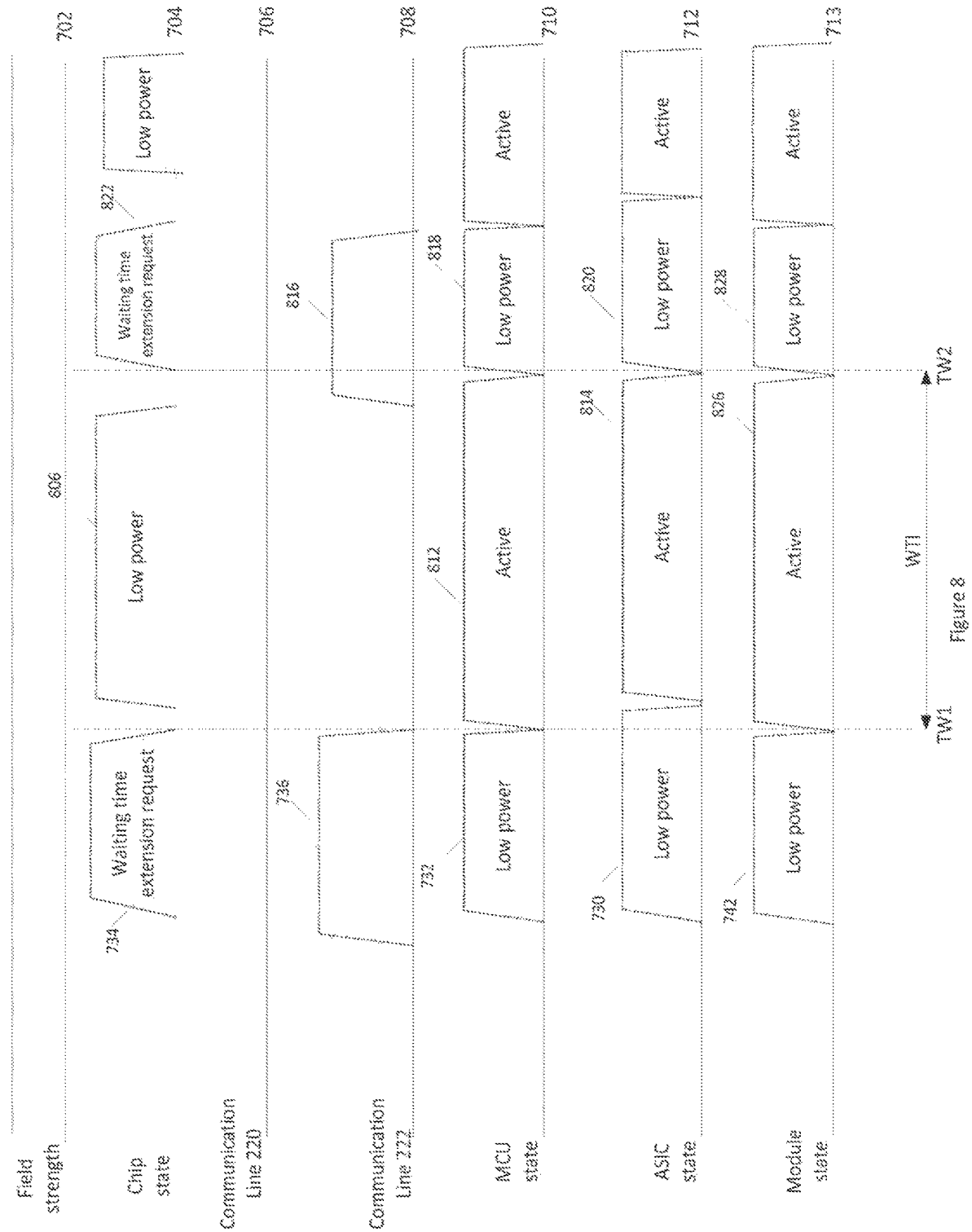
FIG. 8 shows a timing diagram illustrating the second synchronisation technique at a subsequent stage to boot-up.

FIG. 8 shows a timing diagram illustrating the second synchronisation approach during the operation of the device 100 following the initialisation of the bootup process of the module 108 shown in FIG. 7.

The completion of the waiting time extension request transmission 734 extends the waiting time to TW2 and sets a new waiting time interval WTI in which a further communication from the chip 106 is expected by the terminal 102. Following the transmission of the waiting time extension request 734, if the chip is not required for subsequent operations by the module in the new waiting time interval, it may transition to a low powered state, indicated by block 806, otherwise the chip may remain in an active state.

The transition of the state of communication line 222 from its second state back to its first state (indicated by the falling edge of line 736) signals to the module's MCU and ASIC that the waiting time extension request 734 has been sent to the terminal (i.e. the transmission of the waiting time extension request has been completed). The falling edge indicates the start of the new waiting time interval. This signal causes one or both of the MCU and ASIC to transition from their low powered states to active states, indicated by blocks 812 and 814 respectively. Because at least one of the module's components is in an active state, the module itself is said to be in an active state, shown by block 826.

In this example the MCU 212 may be programmed to know the waiting time interval, and may select a subset of one or more discrete operations to be performed within the waiting time interval, subject to sufficient harvested power (702) continuing to be available. In other words, the MCU 212 may identify a subset of one or more discrete operations to be performed in dependence on the waiting time interval. That subset of one or more discrete operations may be performed by the MCU, the ASIC, or a combination of both the MCU and ASIC. The discrete operations may form part of one of the biometric authentication steps described above, for example acquiring a portion of an image using the sensor 218 under the control of the ASIC. The MCU and/or ASIC perform their subset of discrete operations when in the active state.

Whether the MCU, ASIC or both of the MCU and ASIC transition to the active state may depend on the one or more discrete operations to be performed within the waiting time interval. For example, the process of image acquisition using sensor 218 may be controlled only by the ASIC 214, in which case only the ASIC may transition to the active state during the waiting time interval. As another example, the process of image matching may be performed only by the MCU, and so if the discrete operations to be performed within the waiting time interval are operations forming part of image matching, only the MCU (and not the ASIC) may transition to the active state. Thus, the components of the module 108 that transition to the active state may be limited to the components required to perform the one or more discrete operations to be performed within the waiting time interval.

Prior to the expiry of the waiting time interval (and thus prior to the next scheduled communication to the terminal 102 at time TW2), the chip 106 causes the state of communication line 222 to transition from its first state to its second state. This transition (indicated by the rising edge of line 816) signals to the MCU and ASIC that a waiting time extension request 822 is to be sent to the terminal. In response to this signal, the MCU and ASIC complete or interrupt the discrete operations being performed. The module (e.g. the MCU) then determines whether all its processing is complete. If the module determines its processing is not complete, the module transitions to a low-powered state and takes no further action. If the module determines its processing is complete, it signals to the chip indicating its processing is complete (discussed in more detail below).

In this example it is assumed the module's processing is not complete and so the MCU and ASIC transition to a low-powered state in response to the signal from the chip (shown at blocks 818 and 820 respectively). When both the ASIC and MCU are in the low power state, the module is in a low power state, shown at block 828. The chip 106 may signal to the module that a waiting time extension request 822 is to be sent a specified time interval $\Delta T$ prior to that waiting time extension request being sent. This enables the MCU and ASIC to transition to their low power states prior to the transmission of the waiting time extension request 822. The MCU and ASIC may be configured to transition to their low powered state within a time period of receiving the signal from the chip that is equal to the specified time interval $\Delta T$. The value of $\Delta T$ may vary by implementation, but in one example $\Delta T=1$ ms.

The module may decide whether to interrupt or complete the processing of the discrete operations in response to receiving the signal from the chip in dependence on: (i) the amount of processing remaining to complete the subset of discrete operations at the time the second signal was received, and (ii) the amount of time prior to the expiry of the waiting time interval (e.g. the value of $\Delta T$). If the module determines there is sufficient time to complete the subset of discrete operations, it may do so before transitioning to the low power state. In contrast, if the module determines there is insufficient time to complete the subset of discrete operations, it may interrupt the active operation being performed and then transition to the low power state.

If the module has not completed its processing prior to the expiry of the waiting time interval, the chip 106 sends the further waiting time extension request 822 to the terminal. By the time the chip begins the transmission of the waiting time extension request 822, the module's MCU and ASIC have transitioned to the low power state. If on the other hand the module has completed its processing, no further waiting time extension is required.

FIGS. 7 and 8 illustrate how, in the second synchronisation method, the state of the communication line 2 between the chip 106 and module 108 synchronises the operation of the module to the scheduled communications from the chip to the terminal 102. The state of the communication line is controlled by the chip 106. By synchronising the state changes of the communication line 222 to the scheduled communications to the terminal, the operation of the module components can be controlled so that they are in a low-powered state during transmissions of the waiting time extension requests, and in an active state to perform one or more discrete operations during the waiting interval between scheduled communications to the terminal.

Figure 9:
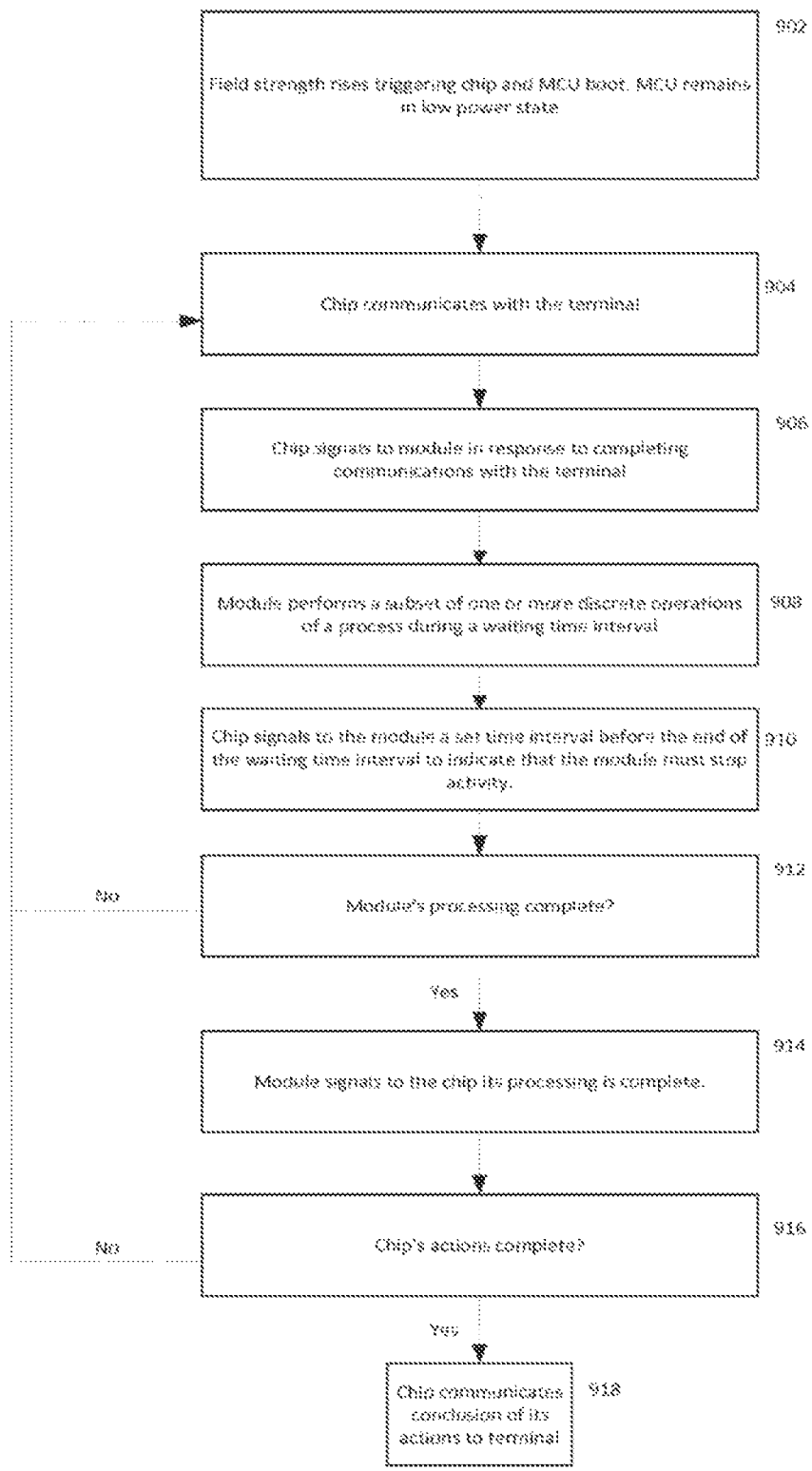
FIG. 9 shows a flowchart illustrating the steps of the second synchronisation technique.

The second synchronisation process implemented by the device 100 can be summarised by the flowchart in FIG. 9.

At step 902, the device is brought in range of the terminal such that the field strength rises beyond a specified threshold, triggering the chip and MCU to boot up. The MCU may remain in a low power state.

At step 904, the chip 106 enters an active state and communicates with the terminal. The first time through the loop shown in FIG. 9, the communication involves the chip receiving a command from the terminal, setting an initial waiting time for a response. The command from the terminal may be a request for a function (e.g. biometric authentication or enrolment) to be performed. For subsequent passes through the loop, at step 904 the chip sends a request to the terminal to extend the waiting time for response at the expiry of the previous waiting time interval.

At step 906, the chip 106 communicates a first signal to the module indicating communications with the terminal are complete. For the first pass through the steps shown in FIG. 9, the chip may do this by sending a command 722 over communication line 220 requesting that the module perform processing as part of performing the process requested by the terminal. For subsequent passes through the steps shown in FIG. 9 the chip may do this by transitioning the state of the communication line 222 from a first state to a second state. Completion of this communication with the terminal sets a new waiting time interval in which a subsequent communication is to be sent to the terminal. In response to the completion of the communication with the terminal, the module transitions to an active state and optionally starts an internal timer for the start of the waiting time interval. Optionally, the chip may enter a low power state after signalling to the module.

At step 908, the module performs a subset of one or more discrete operations. The module may determine the subset of discrete operations to be performed in dependence on the length of the waiting time interval and/or the level of available power harvested from the signal emitted from the terminal 102. These discrete operations are performed within the waiting time interval set by the transmission protocol by which messages are communicated between the device 100 and terminal 102. The waiting time interval is the time interval in which a communication is to be sent from the chip to the terminal. The waiting time interval may be a time interval between successive scheduled transmissions between the device 100 and terminal 102. The waiting time interval may be the time interval between a command sent by the terminal and an initial waiting time for a response to that command. Alternatively, the waiting time interval may be the time interval between a waiting time extension request being sent to the terminal, and the extended waiting time resulting from that request.

At step 910, the chip 106 communicates to the module 108 a second signal indicating the module is to stop processing its discrete operation. This second signal indicates that a waiting time a waiting time extension request is to be sent to the terminal; i.e. it indicates that the next waiting time extension request is scheduled for communication. The chip may send the second signal by transitioning the state of the communication line 222 from the second state back to the first state. The second signal is communicated to the module prior to the expiry of the waiting time interval. The second signal may be communicated a specified time period $\Delta T$ before the expiry of the waiting time interval (i.e. at a time $\Delta T$ prior to the communication of the waiting time extension request). The module 108 completes or stops processing its one or more discrete operations in response to receiving the first signal. The module completes or stops the processing prior to the expiry of the waiting time interval (i.e., prior to the communication of the waiting time extension request to the terminal). The module may be configured to complete or stop processing its one or more discrete operations within the time period $\Delta T$ of receiving the first signal.

Having stopped processing its discrete operations, the module at step 912 determines whether its processing is complete. That is, the module determines whether all the discrete operations forming the processing steps 306 it is to perform have been completed. This determination may be performed by the MCU. Processing may be complete when the module has performed all its allocated processing steps required to implement the second function of the device. If the module determines its processing is not complete, it transitions to a low power state and takes no further action. The method then returns to step 904, where the chip communicates a waiting time extension request to the terminal.

If the module determines at step 912 that its processing is complete, it sends a message to the chip indicating its processing is complete (step 914). The message may indicate the outcome, or result, of the processing performed by the module. For example, if the module performs each step of the biometric authentication, the message may contain the result of the authentication (i.e. whether the device user is authenticated or not). For implementations where the image matching is performed by the chip, the message may contain data for the captured image to enable the chip to perform the image matching, e.g. data representing the captured image or data representing extracted features from the captured image. The message may be sent over communication line 220. Having sent the message, the module may enter a low powered state.

At step 916 the chip, in response to receiving the message from the module, determines whether its actions are complete. The chip may for example determine whether the function requested by the terminal at step 904 is complete. The chip may determine that its actions are complete when the function requested by the terminal has been completed. Put another way, the chip determines whether further waiting time extension requests are required.

If both the chip and the module perform processing steps to complete the function requested by the terminal, the message received from the module at step 914 may indicate that the chip is to perform its processing steps to perform the requested function.

If the chip determines that its actions are not complete, the method returns to step 904, where the chip communicates a waiting time extension request to the terminal. If the module has completed its processing, the chip may then proceed to perform its processing in waiting time intervals between successive waiting time extension requests being sent to the terminal.

If the chip determines at step 916 that its actions are complete, the method proceeds to step 918 where the chip communicates a message to the terminal indicating the conclusion of its action. The message may indicate the function requested by the terminal has been completed. It may additionally indicate the outcome of the function (e.g. whether the user of the device has been authenticated or not). Having communicated the message to the terminal, the chip may enter a low power state. Further waiting time extension requests might not be sent when the chip determines its actions are complete.

The third synchronisation approach will now be described.

Figure 10:
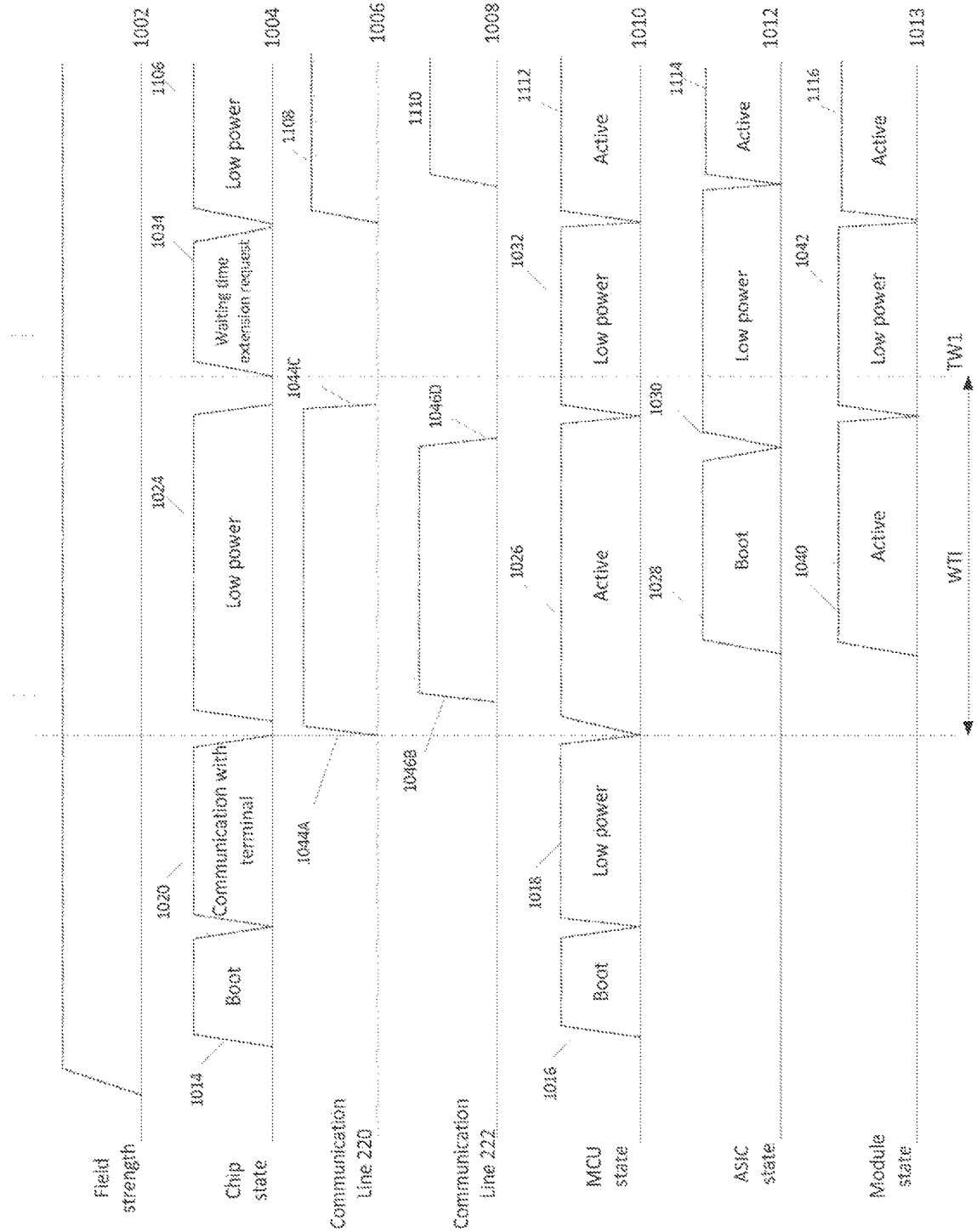
FIG. 10 shows a timing diagram illustrating a third synchronisation technique during boot-up of the module.

FIG. 10 is a timing diagram illustrating the third synchronisation approach during the bootup process. Time is again represented along the x-axis. Line 1002 shows the field strength of the signal emitted from the terminal as received by the device 100 as the device is brought into proximity of the terminal and remains in range. Line 1004 represents the state of the chip 106; line 1006 illustrates communications along communication line 220 between the chip 106 and module 108. Line 1008 represents the state of communication line 222 between the chip 106 and module 108. Communication lines 220 and 222 may be physical links. Communication line 222 may be a separate line to the communication line 220 (physically and/or logically). Line 1010 represents the state of the module's MCU 212; line 1012 represents the state of the module's ASIC 214 and line 1013 the general state of the module. The module 108 is taken to be in an active state on line 1013 when at least one of its components is in an active state, and in a low powered state on line 1013 when all of its components are in a low powered state.

As described before, the power management units of the chip 106 and module measure the induced voltage from the signal emitted from the terminal 102. When the measured voltage increases beyond a specified voltage, the chip 106 and the module's MCU 212 boot-up, illustrated by blocks 1014 and 1016 respectively. The chip 106 and MCU 212 boot-up concurrently but independently of each other as the device 100 is brought into range of the terminal.

Following bootup, the MCU 212 enters a low-power state, illustrated at block 1018. The chip 106 then communicates with the terminal 102 following completion of its bootup, illustrated by block 1020. This communication is in accordance with the EMVCo® and ISO14443 standards. During this communication, the MCU is in a low power state and the ASIC has yet to be powered up and thus power drawn by the module is kept to a minimum, thereby reducing interference in the communications between the chip and terminal. Communication 1020 is analogous to communications 418 and 720 shown in FIGS. 4 and 7 respectively and described above.

The communication 1020 from the terminal 102 sets an initial waiting time for a response to the terminal. That initial waiting time is denoted TW1. The time period between the communication 1020 and the initial waiting time defines a waiting time interval WTI. Within this waiting time interval, either a request for a waiting time extension or a response to the terminal is to be sent from the chip 106 to the terminal 102 to avoid connection to the terminal being lost.

In response to completing the communication 1020 with the terminal, the chip 106 indicates to the module that it should transition out of its low powered state and carry out processing as part of performing the function requested by the terminal. In this example, the chip signals this command by changing the state of communication line 220 from a first state to a second state. This is illustrated at 1044A. The module 108 may be configured to interpret the change of state (in this example, the rising edge of the state) as the signal to transition out the low powered state. Signal 1044A may therefore indicate that the chip's communication with the terminal has completed. The state of communication line 220 may be the voltage level of the line. The first state may be associated with a first voltage level, and the second state associated with a second voltage level. The change of state also indicates the start of the waiting time interval. The second voltage level may be lower than the first voltage level. Alternatively, the first voltage level may be lower than the second voltage level.

The command signal 1044A is received at the module's MCU 212. In response to receiving the signal 1044A, the MCU 212 transitions out of its low power state (illustrated by block 1026) to an active state. The MCU may start a timer at the beginning of the waiting time interval resulting from the chip's communication 1020 with the terminal, and may be programmed to know the waiting time interval.

Once the MCU has transitioned out of its low powered state, the MCU 212 sends in response to receiving the signal 1044A an acknowledgement to the chip that it received the signal. In this example, the module signals this command by changing the state of communication line 222 from a first state to a second state. This is illustrated at 1046B. The chip may be configured to interpret the change of state (in this example, the rising edge of the state) as the signal that the module is active, and an acknowledgement that signal 1044A has been received. The state of communication line 222 may be the voltage level of the line. The first state may be associated with a first voltage level, and the second state associated with a second voltage level. The first voltage level of communication line 222 may be lower than the second voltage level.

If the chip is not required for subsequent operations by the module during the waiting time interval, the chip 106 may transition to a low power state (shown by block 1024) after sending the signal 1044A. For example, if the module is capable of managing its own power and hence operating independently of the chip due to the device architecture discussed in FIG. 1, then the chip may enter a low power state during the waiting time interval since it is not required by the module to be in an active state during the waiting time interval. Alternatively, if the module requires the chip to manage its power supply, or if the module requires the chip to participate in its processing over the waiting time interval, then the chip remains in an active state. In a further alternative, if the available power is greater than or equal to the power budget required by the chip and the module, then the chip may remain in an active state.

Returning to block 1026, the MCU, having transitioned to an active state, may select a subset of one or more discrete operations to be performed within the waiting time interval, subject to sufficient harvested power (1002) continuing to be available. In other words, the MCU 212 may identify a subset of one or more discrete operations to be performed in dependence on the waiting time interval. That subset of one or more discrete operations may be performed by the MCU, the ASIC (allocated by the MCU), a combination of both the MCU and ASIC or some other component of the module. The discrete operations may form part of one of the biometric authentication steps described above. For the purposes of illustration, in this example the discrete operations form part of the processing steps involved in booting the ASIC 214, for example, bootloading, firmware initialisation, calibration and tuning. Thus, the MCU 212, having transitioned to an active state, schedules a subset of discrete operations to start to boot the module's ASIC 214 at block 1028. That is, signal 1044 triggers the boot of the module's ASIC.

It is convenient if the boot of the ASIC can be entirely completed within the agreed waiting time interval WTI, though in some instances the processing step of booting the ASIC may span multiple waiting time intervals separated by extension requests. In the example illustrated in FIG. 10, it is assumed that the module completes the boot of the ASIC within the illustrated waiting time interval. To increase the likelihood that the bootup of the ASIC 214 can be completed within the waiting time interval WTI, the chip 100 may be configured to send the signal 1044A immediately following the completion of the communication with the terminal 1020.

Upon completion of its allocated subset of discrete operations within the WTI, the ASIC transitions to a low power state, shown at block 1030. In response to the ASIC completing its operations and transitioning to a low powered state within the WTI, the module sends a signal to the chip. In this example, the module sends this signal by changing the state of communication line 222 from the second state back to the first state. This is illustrated at 1046D. The chip may be configured to interpret the change of state (in this example, the falling edge of the state) as the signal that the module is ready. That is, the signal 1046D may indicate to the chip that the module has successfully booted its ASIC. More generally, signal 1046D may indicate to the chip that the module has successfully booted its components. Signal 1046D may therefore be referred to as a heartbeat signal.

After the module communicates signal 1046D, the MCU transitions to a low powered state 1032. Since both the MCU and ASIC have powered down to the low powered state, the module 108 is in a low power state (denoted by block 1042 on line 1013), thus power drawn by the module that may result in interference in the communications between the chip and terminal is kept to a minimum.

The chip transitions out of its low-powered state prior to the expiry of the waiting time interval (i.e. prior to the initial waiting time TW1) and communicates a waiting time extension request 1034 to the terminal. The device may include an internal timer or clock that signals to the chip to transition out of the low powered state prior to waiting time TW1. The timer may be local to the chip. In some implementations, it may be included within the chip. In other implementations, the chip may be configured to transition out of its low powered state 1024 in response to receiving the signal 1046D from the module. That is, signal 1046D may indicate that the module is ready and cause the chip to transition to an active state in order to communicate the waiting time extension request 1034.

Upon transitioning out of its low powered state, the chip changes the state of its communication line 220 from the second state back to the first state (illustrated at 1044C). Thus, the communication line 220 is in the first state during the time period the chip is communicating the waiting time extension request 1034 to the terminal.

Following the initialisation of the bootup process of the module and chip, subsequent operations may occur shown by blocks 1106, 1108, 1112, 1114 and 1116). These are shown in more detail in the timing diagram of FIG. 11.

The completion of the waiting time extension request 1034 transmission extends the waiting time to TW2 and sets a new waiting time interval WTI in which a further communication from the chip 106 is expected by the terminal 102.

The chip signals to the module's MCU and ASIC that the waiting time extension request 1034 has been sent to the terminal (i.e. the transmission of the waiting time extension request has been completed). The chip signals this by transitioning the state of communication line 220 from its first state back to its second state (indicated by the rising edge 1108A) The rising edge indicates the start of a new waiting time interval WTI. This signal 1108A may be referred to as a 'communication complete' signal, and causes one or both of the MCU and ASIC to transition from their low powered states to active states, indicated by blocks 1112 and 1114 respectively. Because at least one of the module's components is in an active state, the module itself is said to be in an active state, shown by block 1116.

Having transitioned to an active state, the module sends a signal to the chip in response to receiving the 'communication complete' signal 1108A. In this example, the module signals its response by changing the state of communication line 222 from the first state back to the second state. This is illustrated by the rising edge 1110B. The chip may be configured to interpret the change of state (in this example, the rising edge of the state) as the signal that the module is active. This signal may be referred to as an acknowledgement signal. In other words, signal 1110B may indicate that signal 1108A has been received and/or that the module has transitioned to an active state.

If the chip is not required for subsequent operations by the module during the waiting time interval, it may transition to a low power state (shown by block 1106). The chip may transition to the low powered state in response to sending the 'communication complete' signal 1108. Alternatively, the chip may transition to the low powered state only in response to receiving the acknowledgement signal 1110.

Returning to block 1112 and the MCU 212, having transitioned to an active state, may select a subset of one or more discrete operations to be performed within the waiting time interval, subject to sufficient harvested power (1002) continuing to be available. In other words, the MCU 212 may identify a subset of one or more discrete operations to be performed in dependence on the waiting time interval. That subset of one or more discrete operations may be performed by the MCU, the ASIC, or a combination of both the MCU and ASIC. The discrete operations may form part of one of the biometric authentication steps described above, for example acquiring a portion of an image using the sensor 218 under the control of the ASIC. The MCU and/or ASIC perform their subset of discrete operations when in the active state.

Whether the MCU, ASIC or both of the MCU and ASIC transition to the active state may depend on the one or more discrete operations to be performed within the waiting time interval. For example, the process of image acquisition using sensor 218 may be controlled only by the ASIC 214, in which case only the ASIC may transition to the active state during the waiting time interval. As another example, the process of image matching may be performed only by the MCU, and so if the discrete operations to be performed within the waiting time interval are operations forming part of image matching, only the MCU (and not the ASIC) may transition to the active state. Thus, the components of the module 108 that transition to the active state may be limited to the components required to perform the one or more discrete operations to be performed within the waiting time interval.

Prior to the expiry of the waiting time interval (and thus prior to the next scheduled communication to the terminal 102 at time TW2), the chip 106 causes the state of communication line 222 to transition from its second state back to its first state. This transition (indicated by the falling edge 1108C) signals to the MCU and ASIC that a waiting time extension request 1122 is scheduled for communication to the terminal. In response to this signal 1108C, the MCU and ASIC complete or interrupt the discrete operations being performed. The module (e.g. the MCU) then determines whether all its processing is complete. If the module determines its processing is not complete, the module signals to the chip that it received signal 1108C and transitions to a low-powered state. The module may signal receipt of signal 1108C by transitioning the state of the communication line 222 from its second state back to its first state, illustrated by the falling edge 1110D. Signal 1110D may therefore be viewed as an acknowledgement signal that the signal 1108C from the chip has been received. Signal 1110D may indicate to the chip that the module is halting its processing and transitioning to a low powered state. If the module determines its processing is complete, it signals to the chip indicating its processing is complete (discussed in more detail below).

In this example it is assumed the module's processing is not complete. The MCU and ASIC transition to a low-powered state (shown at blocks 1118 and 1120 respectively). When both the ASIC and MCU are in the low power state, the module is in a low power state, shown at block 1128. The chip 106 may signal to the module that a waiting time extension request 1122 is to be sent a specified time interval ΔT prior to that waiting time extension request being sent. This enables the MCU and ASIC to transition to their low power states prior to the transmission of the waiting time extension request 1122, minimising interference in the communications between the chip and terminal that may be caused by the module drawing power. The MCU and ASIC may be configured to transition to their low powered state within a time period of receiving the signal from the chip that is equal to the specified time interval ΔT. The value of ΔT may vary by implementation, but in one example ΔT=1 ms.

Since it is assumed that the module has not completed its processing prior to the expiry of the waiting time interval, the chip 106 sends the further waiting time extension request 1122. If on the other hand the module completes its processing during the waiting time interval, no further waiting time extension may be required.

Figure 11:
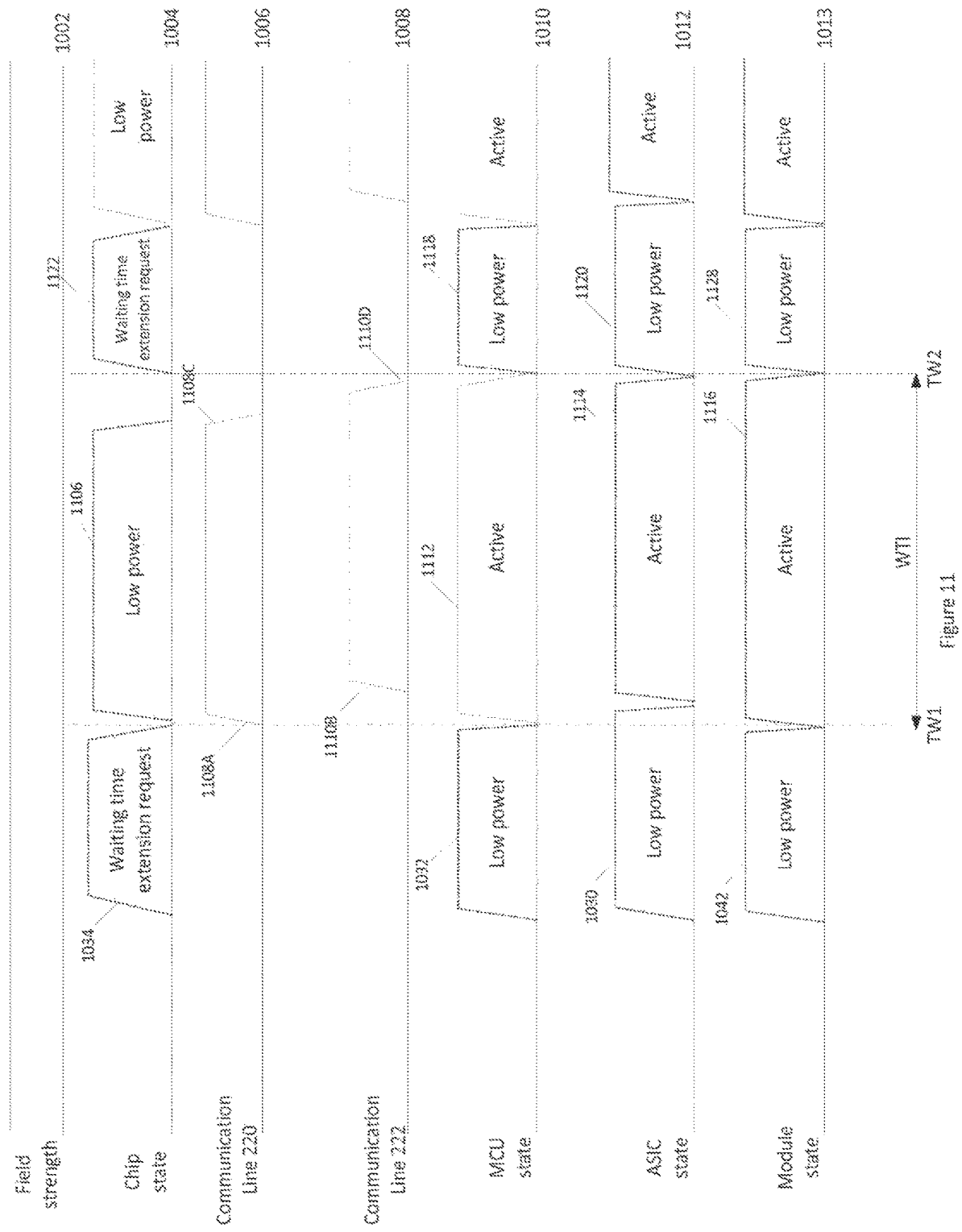
FIG. 11 shows a timing diagram illustrating the third synchronisation technique at a subsequent stage to boot-up.

FIGS. 10 and 11 illustrate how, in the third synchronisation method, the state of the communication lines 220 and 222 between the chip 106 and module 108 synchronises the operation of the module to the scheduled communications from the chip to the terminal 102. The state of the communication line 220 is controlled by the chip 106 and the state of the communication line 222 is controlled by the module. By synchronising the state changes of the communication line 222 to the scheduled communications to the terminal, the operation of the module components can be controlled so that they are in a low-powered state during transmissions of the waiting time extension requests, and in an active state to perform one or more discrete operations during the waiting interval between scheduled communications to the terminal.

Using the state of the communication lines to convey signals between the module and chip is a convenient implementation because it enables two types of signal to be communicated over a single communication line, reducing the number of communication lines between the chip and module required in the device. For instance, both signal 1108A indicating the waiting time extension request has been communicated to the terminal, and signal 1108C indicating a further waiting time extension request is scheduled for communication can be communicated over a single communication line 220 by opposing state transitions of that line. Similarly, two types of acknowledgement signal can be communicated from the module to the chip over line 222: a first type of acknowledgement signal in response to receiving signal 1108A can be communicated through a first state transition of line 222, and a second type of acknowledgement signal in response to receiving signal 1108C can be communicated through a second opposing state transition of line 222.

A further advantage of the third approach is that the module is able to signal back to the chip in response, providing a so-called "handshake". This handshake provides opportunities for recovering from error conditions, for example, if the chip does not receive a response from the module within a certain time, it can take mitigating action, such as retrying until a response is received. Examples of how errors could occur may be if the device is momentarily moved out of range of the terminal, causing the harvested power level to drop, or if noise on the signal causes a signal from either component to be misinterpreted.

Figure 13:
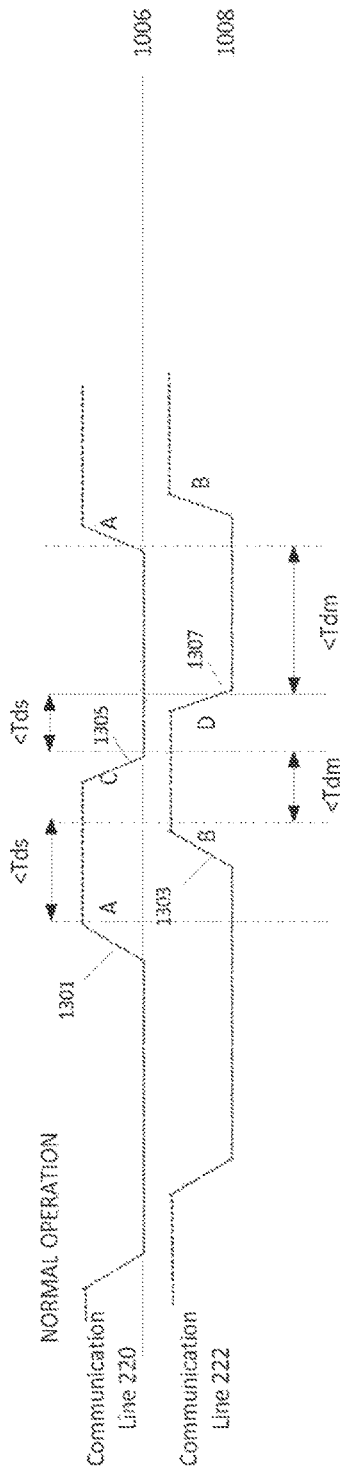
FIG. 13 shows a timing diagram illustrating the communications between the chip and module according to the third synchronisation technique.
Figure 14:
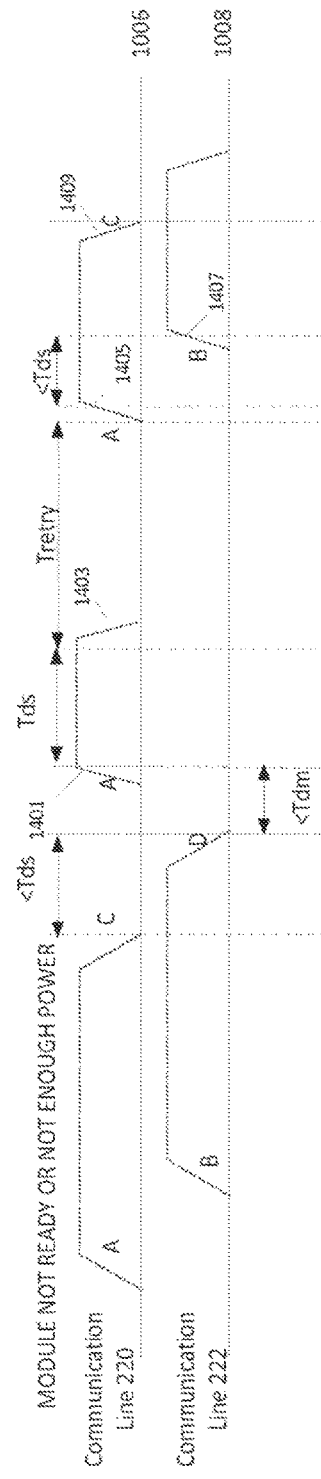
FIG. 14 shows a timing diagram illustrating the communications between the chip and module according to the third synchronisation technique when the module fails to acknowledge a communication from the chip.
Figure 15:
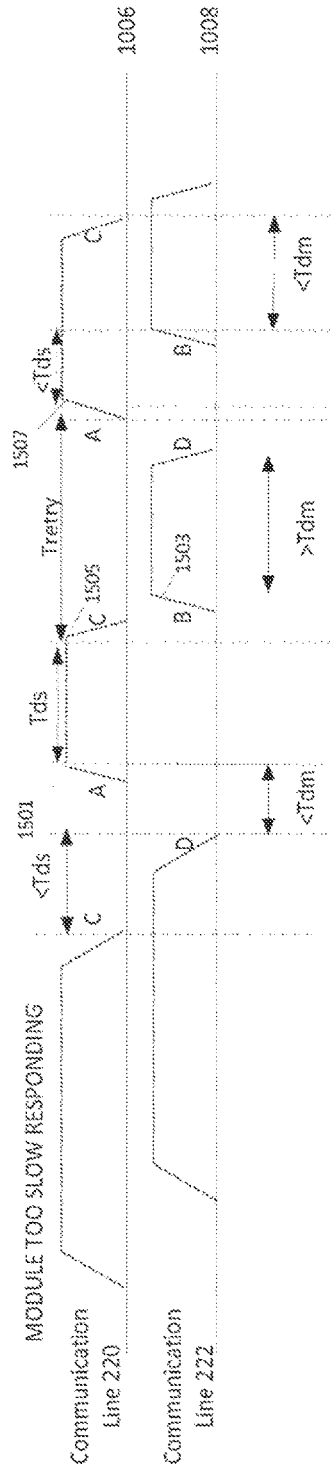
FIG. 15 shows a timing diagram illustrating the communications between the chip and module according to the third synchronisation technique when the module fails to acknowledge a communication from the chip within a specified time period.

Some examples of how the handshake provides recovery opportunity are illustrated in FIGS. 13 to 15. FIG. 13 shows a normal handshake between the chip and module using communication lines 220 and 222, as previously portrayed in FIGS. 10 and 11. At state transition A (indicated at 1301), the chip signals to the module and the module sends a response signal with a state transition B 1303 within a time period Tds where Tds is the maximum delay permitted between the chip sending a signal to the module, and detecting a response from the module. The chip may now enter a low power state in response to receiving the reply signal from the module. The signal indicated by state transition 1301 could be, for example, a communication complete signal indicating that a waiting time extension request has been sent to the terminal, and the response signal indicated by state transition 1303 could be an acknowledgement signal.

A certain time later, less than Tdm, the chip becomes active and signals to the module once more by transitioning its communication line 220 back to its original state (shown by state transition C, labelled 1305). Tdm is the maximum delay permitted between the module sending a signal to the chip and detecting a response from the chip. The module responds to this signal by transitioning its communication line back to its original state within a time period Tds (shown by state transition D, labelled 1307). The signal indicated by state transition C could be, for example, a suspend signal indicating a waiting time extension request is to be sent to the terminal. The signal indicated by state transition D could be an acknowledgement signal indicating the module has stopped processing and transitioned to a low power state. A certain time later, less than Tdm, the process may repeat once more, for example in a subsequent waiting time interval.

FIG. 14 shows what may happen if the module does not respond to the chip, for example if it is not ready or there is not enough power. At state transition A (labelled 1401), the chip signals to the module but the module does not send a response signal through a state transition B within the specified time period Tds. After the time period Tds, the chip transitions back to its previous state (i.e. its state prior to state transition A), illustrated at 1403. The chip then waits for a specified time period Tretry after the expiration of the time period Tds before resending the signal to the module with another state transition A (labelled 1405). Tretry may be the minimum delay permitted between expiration of the time period Tds to resending another signal. This time, the module responds with a return signal through state transition B (labelled 1407) within the time period Tds. A certain time later, less than Tdm, the chip signals to the module once more by transitioning its communication line back to its original state with state transition C (labelled 1409). A certain time later, less than Tds, the process may repeat once more.

FIG. 14 provides an illustration of an advantage of the third synchronisation approach. For example, assume that the signal indicated by transition 1401 is a signal indicating a waiting time extension request has been transmitted to the terminal. If that signal is not received by the module then, absent the error recovery mechanism shown in FIG. 14, the module may remain in its low power state and not transition to an active state for the duration of the resultant WTI. However, the use of acknowledgement signals enables the chip to determine that the module has not received a previous signal (and so may be in a low powered state), and so that signal should be resent. By resending the signal, the chip provides the module with a further opportunity to transition to the active state within the WTI.

FIG. 15 shows what may happen if the module responds to the chip, but responds too slowly. At state transition A (labelled 1501), the chip signals to the module but the module sends its response signal (through state transition B, labelled 1503) after the time period Tds has passed, i.e. after the time window in which it should have responded. After the time period Tds, the chip transitions the state of line 220 back to its previous state through transition C, labelled 1505. As a consequence, the module does not get a response signal from the chip within the specified time period Tdm of transition 1503. After the time period Tdm has expired, the module causes the line 222 to transition back to its original state through transition D (i.e. the state prior to the transition 8). The module may then transition to a low power state and wait for the chip once more.

After a time period Tretry has passed following the expiration of the time period Tds, the chip resends the signal to the module through state transition A of its communication line 220 (labelled 1507). This time, the module sends a response signal through state transition B within a time period Tds. A certain time later, less than Tdm, the chip signals to the module once more by transitioning its communication line back to its original state through transition C. The process may then repeat once more.

Thus, in summary, the chip and module may communicate with each other according to a protocol in which a signal from the chip to the module sets a time period Tds for the module to send a response signal to the chip. Failure by the module to do so causes the chip to wait for a time period Tretry after expiry of the time period Tds before resending the signal to the module.

Figure 12:
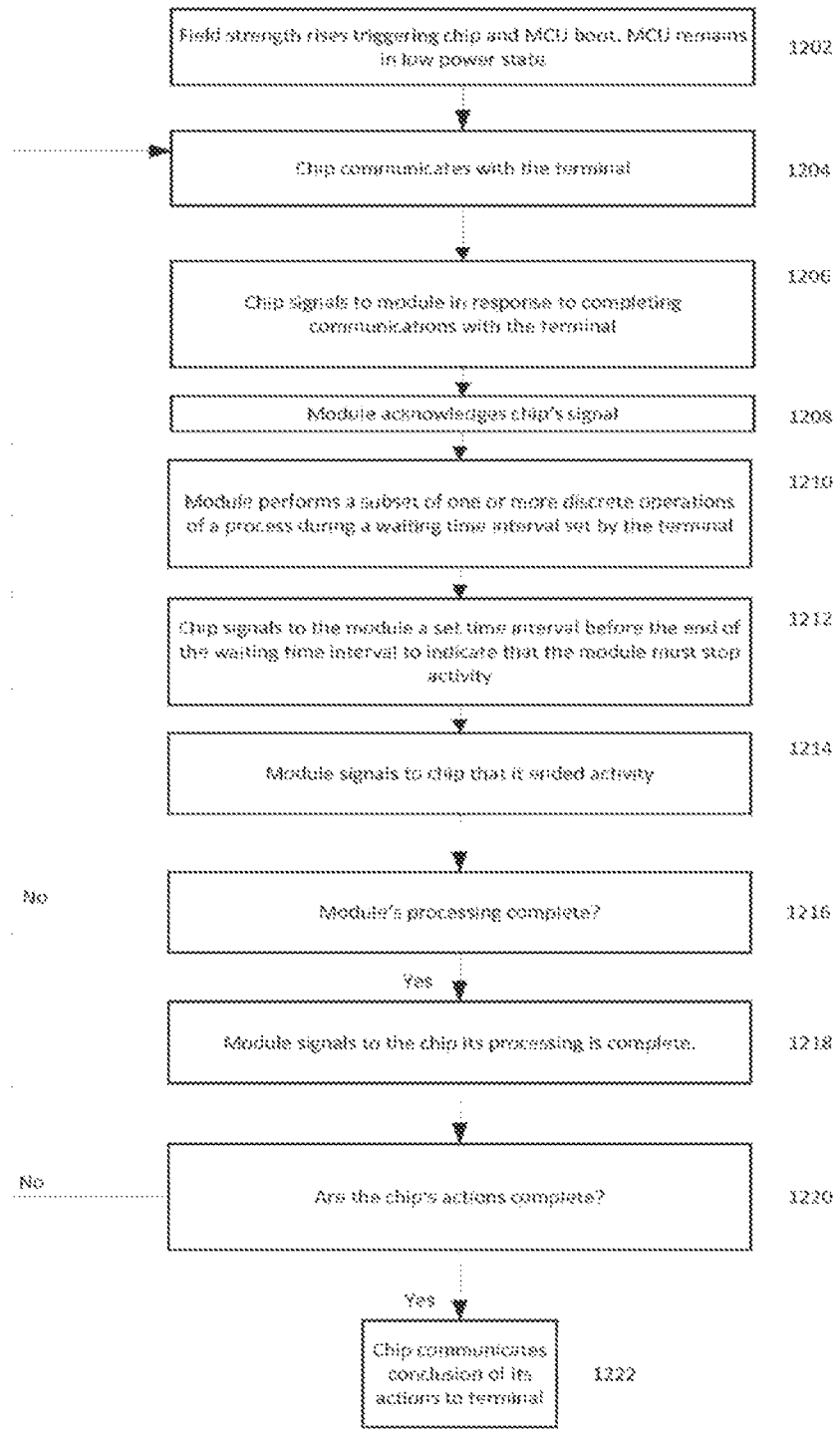
FIG. 12 shows a flowchart illustrating the steps of the third synchronisation technique.

The third synchronisation process implemented by the device 100 can be summarised by the flowchart in FIG. 12.

At step 1202, the device is brought in range of the terminal such that the field strength rises beyond a specified threshold, triggering the chip and MCU to boot up. The MCU may remain in a low power state.

At step 1204, the chip 106 enters an active state and communicates to the terminal. The first time through the loop shown in FIG. 12, the communication involves the chip receiving a command from the terminal, setting an initial waiting time for a response. The command from the terminal may be a request for a process (e.g. biometric authentication or enrolment) to be performed. For subsequent passes through the loop, at step 904 the chip sends a request to the terminal to extend the waiting time for response at the expiry of the previous waiting time interval.

At step 1206, the chip 106 communicates a first signal to the module indicating communications with the terminal are complete. The chip may do this by transitioning the state of the communication line 222 from a first state to a second state. Completion of this communication with the terminal sets a new waiting time interval in which a subsequent communication is to be sent to the terminal. In response to the completion of the communication with the terminal, the module transitions to an active state and optionally starts an internal timer for the start of the waiting time interval. Optionally, the chip may enter a low power state after signalling to the module.

At step 1208, the module acknowledges the first signal from the chip and begins activity. The module may acknowledge the first signal by sending an acknowledgement signal in reply to the chip. The module may do this by transitioning the state of the communication line 220 from a first state to a second state. The acknowledgement signal may indicate that the module has transitioned to an active state. Though not shown in FIG. 12, the chip may resend the first signal to the module (e.g. by re-transitioning the state of line 222 from the first state to the second state) if it does not receive the acknowledgement signal within a specified time period Tds.

At step 1210, the module performs a subset of one or more discrete operations. The module may determine the subset of discrete operations to be performed in dependence on the length of the waiting time interval and/or the level of available power harvested from the signal emitted from the terminal 102. These discrete operations are performed within a waiting time interval set by the transmission protocol by which messages are communicated between the device 100 and terminal 102.

At step 1212, the chip 106 communicates to the module 108 a second signal indicating a waiting time extension request is to be sent to the terminal. The second signal indicates the module is to stop processing its discrete operations. The second signal is communicated to the module prior to the expiry of the waiting time interval. The second signal may be communicated a specified time period ΔT before the expiry of the waiting time interval (i.e. at a time ΔT prior to the communication of the waiting time extension request). The module 108 completes or stops processing its one or more discrete operations in response to receiving the first signal. The module completes or stops the processing prior to the expiry of the waiting time interval (i.e., prior to the communication of the waiting time extension request to the terminal). The module may be configured to complete or stop processing its one or more discrete operations within the time period ΔT of receiving the first signal. The chip may send the second signal by transitioning the state of the communication line 222 from the second state back to the first state.

At step 1214, the module sends an acknowledgement signal to the chip acknowledging the second signal. The acknowledgement signal indicates to the chip that the module's activity has been suspended and it has entered a low power state. The module may send the acknowledgement signal by transitioning the state of the communication line 220 from the second state back to the first state. Though not shown in FIG. 12, the chip may resend the second signal to the module (e.g. by re-transitioning the state of line 222 from the second state to the first state) if it does not receive the acknowledgement signal within a specified time period Tds.

Having stopped processing its discrete operations, the module at step 1216 determines whether its processing is complete. That is, the module determines whether all the discrete operations forming the processing steps 306 it is to perform have been completed. This determination may be performed by the MCU. Processing may be complete when the module has performed all its allocated processing steps required to implement the second function of the device. If the module determines its processing is not complete, it transitions to a low power state and takes no further action. The method then returns to step 1204, where the chip communicates a waiting time extension request to the terminal.

If the module determines at step 1216 that its processing is complete, it sends a message to the chip indicating its processing is complete (step 1218). The message may indicate the outcome, or result, of the processing performed by the module. For example, if the module performs each step of the biometric authentication, the message may contain the result of the authentication (i.e. whether the device user is authenticated or not). For implementations where the image matching is performed by the chip, the message may contain data for the captured image to enable the chip to perform the image matching, e.g. data representing the captured image or data representing extracted features from the captured image. The message may be sent over communication line 220. Having sent the message, the module may enter a low powered state.

In a variation of the method shown in FIG. 12, step 1216 immediately follows step 1212, with step 1214 only being performed responsive to the module determining that its processing is not complete.

At step 1220 the chip, in response to receiving the message from the module that its processing is complete, determines whether its own actions are complete. The chip may for example determine whether the function requested by the terminal at step 1204 is complete. The chip may determine that its actions are complete when the function requested by the terminal has been completed. Put another way, the chip determines whether further waiting time extension requests are required.

If both the chip and the module perform processing steps to complete the function requested by the terminal, the message received from the module at step 1218 may indicate that the chip is to perform its processing steps to perform the requested function.

If the chip determines that its actions are not complete, the method returns to step 1204, where the chip communicates a waiting time extension request to the terminal. If the module has completed its processing, the chip may then proceed to perform its processing in waiting time intervals between successive waiting time extension requests being sent to the terminal.

If the chip determines at step 1220 that its actions are complete, the method proceeds to step 1222 where the chip communicates a message to the terminal indicating the conclusion of its action. The message may indicate the function requested by the terminal has been completed. It may additionally indicate the outcome of the function (e.g. whether the user of the device has been authenticated or not). Having communicated the message to the terminal, the chip may enter a low power state. Further waiting time extension requests might not be sent when the chip determines its actions are complete.

Approaches have been described herein for synchronising the processing of discrete operations at a device module with scheduled contactless communications between the device's chip and a terminal. This synchronisation enables the discrete operations to be performed during time intervals between the scheduled communications between the device and terminal, and to cause the device's module to enter a low-power mode during the time periods the chip is communicating with the terminal. This synchronisation enables power harvested from the signal emitted from the terminal to be shared between the chip and module. Moreover, by causing the module to enter a low power or inactive state during periods of communication between the chip and terminal, power consumption can be reduced whilst also reducing interference at the terminal from operating the module during periods of communication with the chip. The synchronisation methods also make it feasible to cause the device's chip to enter a low-power or inactive state during time periods where the module is able to operate independently of the chip, thus reducing overall power consumption still further.

Examples have been described herein in which the device is a smart card. It will be understood that the term 'card' does not imply any constraints with regards to its size, shape, thickness or function. The cards described herein could for example be a plastic card such as a banking card, an ID card, a passport etc. It will also be understood that each example described herein could be implemented within a device adopting a different form factor that is not card, for example a fob, a dongle, or a security token (e.g. a USB token). Alternatively, the devices described herein could be integrated into a communication device such as a mobile phone or smartphone; a wearable device, such as a bracelet, watch, a glove/pair of gloves, a pin (e.g. a brooch), a badge or some other contactless wearable device. Reference has also been made herein to a terminal. The terminal of any of the examples described could take any suitable form depending on implementation, for example a card reader such as a point-of-sale (POS) terminal, a cash register, an ATM machine, a computer, a smartphone etc.

Some cards described herein have been referred to as contactless cards. It will be understood that a contactless card, as described herein, refers to a card that can communicate with a reader through a contactless interface. However, each card described as a contactless card may also be capable of communication with a reader through direct physical contact. Thus, the term 'contactless' has not been used herein to exclude the possibility of contact functionality.

In the examples given above the term power may be understood to refer to any relevant feature of energy availability. Examples include available energy, voltage, current and power or any combination thereof.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device for contactless communication with a terminal, comprising:
    an antenna for communication with the terminal;
    an embedded chip configured to communicate with the terminal in accordance with a contactless transmission protocol whereby a message sent by the terminal to the embedded chip sets a specified initial waiting time for a response from the embedded chip to the terminal to maintain a connection with the terminal, the embedded chip being configured to communicate requests to the terminal to extend the waiting time for response; and a module configured to perform processing formed of a plurality of discrete operations, wherein the module is a biometric sensor module and the plurality of discrete operations is a plurality of biometric authentication steps, the module being configured to, in response to completing a subset of one or more discrete operations within a waiting time interval set by the terminal, send a first type of command to the embedded chip if the module determines the processing is not complete and send a second type of command to the embedded chip if the module determines the processing is complete, and wherein the embedded chip is further configured to, in response to receiving the first type of command from the module, communicate a request to the terminal to extend the waiting time for response.

2. A device as claimed in claim 1, wherein the waiting time interval is a time period in which a communication is to be sent from the embedded chip to the terminal to maintain the connection therebetween.

3. A device as claimed in claim 1, wherein the waiting time interval is the time period in which a response to the message or a waiting time extension request is to be communicated from the embedded chip to the terminal to maintain the connection.

4. A device as claimed in claim 1, wherein the waiting time interval is between the time the message from the terminal was received and the initial specified waiting time, or the interval between the time a waiting time extension request was sent to the terminal and an extended waiting time resulting from that request.

5. A device as claimed in claim 1, wherein the embedded chip is configured to, in response to receiving the command before the expiration of the waiting time interval, initiate the communication of the request to the terminal prior to the expiration of the waiting time interval.

6. A device as claimed in claim 1, wherein the embedded chip is configured to indicate to the module that the waiting time extension request has been sent to the terminal.

7. A device as claimed in claim 1, wherein the module comprises a controller unit configured to select a subset of one or more discrete operations to be completed in dependence on the waiting time interval.

8. A device as claimed in claim 7, wherein the controller unit is configured to, in response to the indication the waiting time extension request has been sent to the terminal, select the subset of one or more discrete operations to be performed within the waiting time interval resulting from that request.

9. A device as claimed in claim 1, wherein the embedded chip is configured to, in response to receiving the second type of command from the module, determine whether an action requested by the terminal is complete and:
communicate to the terminal an indication that the action is complete in response to determining that the action is complete; and
communicate to the terminal a waiting time extension request in response to determining that the action is not complete.

10. A method of contactless communication between a device and a terminal, the device comprising an embedded chip and a module, the embedded chip being configured to communicate with the terminal in accordance with a contactless transmission protocol whereby a message sent by the terminal to the embedded chip sets a specified initial waiting time for a response from the embedded chip to the terminal to maintain a connection with the terminal, the embedded chip being configured to communicate requests to the terminal to extend the waiting time for response, the method comprising:

performing at the module within the device processing formed of a plurality of discrete operations during a waiting time interval set by the terminal, wherein the module is a biometric sensor module and the plurality of discrete operations is a plurality of biometric authentication steps;

in response to the module completing a subset of one or more discrete operations within the waiting time interval set by the terminal, sending a first type of command from the module to the embedded chip if the module determines the processing is not complete and sending a second type of command from the module to the embedded chip if the module determines the processing is complete;

in response to the embedded chip receiving the first type of command from the module, communicating from the embedded chip to the terminal a request to extend the waiting time for response.

11. A method as claimed in claim 10, wherein the waiting time interval is a time period in which a communication is to be sent from the embedded chip to the terminal to maintain the connection therebetween.

12. A method as claimed in claim 10, wherein the waiting time interval is the time period in which a response to the message or a waiting time extension request is to be communicated from the embedded chip to the terminal to maintain the connection.

13. A method as claimed in claim 10, wherein the waiting time interval is between the time the message from the terminal was received and the initial specified waiting time, or the interval between the time a waiting time extension request was sent to the terminal and an extended waiting time resulting from that request.

14. A method as claimed in claim 10, wherein the embedded chip is configured to, in response to receiving the command before the expiration of the waiting time interval, initiate the communication of the request to the terminal prior to the expiration of the waiting time interval.

15. A method as claimed in claim 10, wherein the embedded chip is configured to indicate to the module that the waiting time extension request has been sent to the terminal.

16. A method as claimed in claim 10, wherein the embedded chip is configured to, in response to receiving the second type of command from the module, determine whether an action requested by the terminal is complete and:
communicate to the terminal an indication that the action is complete in response to determining that the action is complete; and
communicate to the terminal a waiting time extension request in response to determining that the action is not complete.

* * * * *